United States Patent [19]

Tsai et al.

[11] Patent Number: 5,172,227
[45] Date of Patent: Dec. 15, 1992

[54] IMAGE COMPRESSION WITH COLOR INTERPOLATION FOR A SINGLE SENSOR IMAGE SYSTEM

[75] Inventors: Yushing T. Tsai, Rochester; Scott J. Daly, Scottsville; Majid Rabbani, Pittsford, all of N.Y.

[73] Assignee: Eastman Kodak Company, Rochester, N.Y.

[21] Appl. No.: 625,232

[22] Filed: Dec. 10, 1990

[51] Int. Cl.$^5$ .............................................. H04N 7/13
[52] U.S. Cl. .................................. 358/133; 358/138; 358/13; 358/44
[58] Field of Search ................. 358/133, 135, 138, 13, 358/41, 43, 44

[56] References Cited

U.S. PATENT DOCUMENTS

| | | | |
|---|---|---|---|
| 4,698,689 | 10/1987 | Tzou | 358/133 |
| 4,754,492 | 6/1988 | Malvar | 358/133 |
| 4,774,574 | 9/1988 | Daly et al. | 358/133 |
| 4,780,761 | 10/1988 | Daly et al. | 358/133 |
| 4,974,078 | 11/1990 | Tsai | 358/133 |
| 5,045,925 | 9/1991 | Saito | 358/133 |

OTHER PUBLICATIONS

Scott Daly, "Application of a Noise-Adaptive Contrast Sensitivity Function to Image Data Compression", *Optical Engineering*, Aug., 1990, vol. 29 No. 8, pp. 977-987.
M. I. Sezan et al., "Uniform Perceptual Quantization: Applications to Digital Radiography", IEEE Transactions on Systems, Man and Cybernetics, Jul./Aug. 1987, vol. SMC-17, No. 4, pp. 622-634.

*Primary Examiner*—James J. Groody
*Assistant Examiner*—Michael H. Lee
*Attorney, Agent, or Firm*—Edward Dugas

[57] ABSTRACT

In accordance with the present invention, the R,G,B color image signals from a single sensor having a color filter array are all transformed to $\Gamma$-space by changing them to $R^{1/\Gamma}$, $G^{1/\Gamma}$, $B^{1/\Gamma}$, respectively, where $\Gamma$ is approximately 2.4. In this space, all operations such as color differencing, interpolation of those missing pixels required for color differencing, compression, decompression, edge enhancement and final interpolation of all missing pixels are performed without further transformation of the image signals. For the same final bit rate, noise in the reproduced image is reduced by refraining from interpolating the missing color pixels prior to compression of the image data. In order to avoid over-emphasizing features of the image which are already sufficiently sharp, the combined outputs of horizontal and vertical sharpening processes are subjected to a paring process of the invention which suppresses strong high-spatial frequency components as a function of their amplitude. In the compression-decompression process of the invention, each spatial frequency coefficient of the spatial frequency-transformed image is divided by a normalization factor determined by cascading in the spatial frequency domain the human visual system contrast sensitivity function, the edge enhancement modulation transfer function and the image display modulation transfer function and inversing the resulting matrix elements.

62 Claims, 13 Drawing Sheets

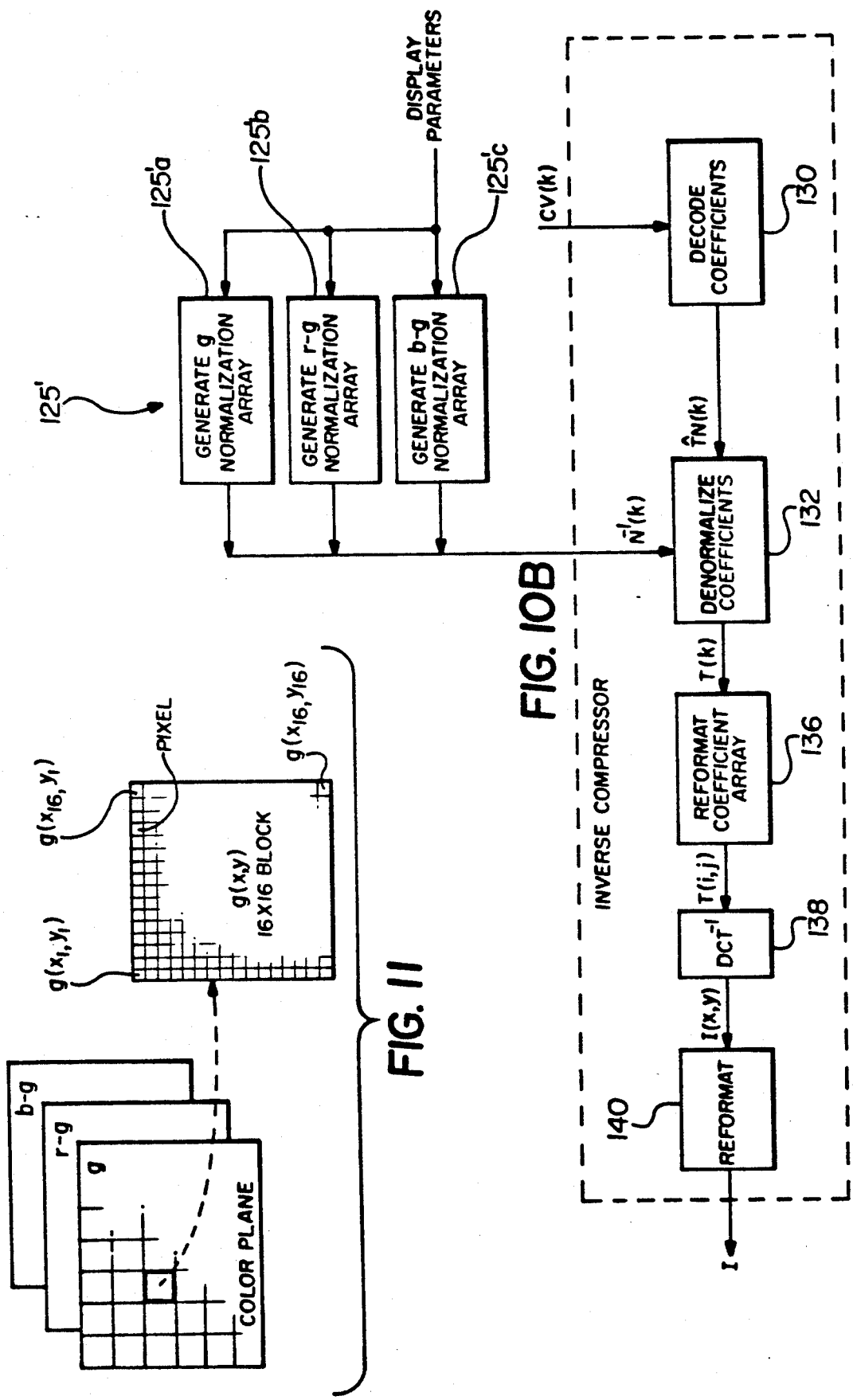

IMAGE COMPRESSION WITH COLOR INTERPOLATION FOR A SINGLE SENSOR IMAGE SYSTEM

BACKGROUND OF THE INVENTION

1. Technical Field

The field of the invention is compression of a color image signal —such as that generated by a single sensor 3-color filter array— whose chrominance-related (e.g., blue and red) components are sub-sampled with respect to its luminance-related (e.g., green) component.

2. Background Art

Electronic color cameras which employ only a single sensor are highly economical compared with electronic color cameras employing three separate sensors (e.g., red, green and blue sensors). A single image sensor (such as a CCD imager integrated circuit) can be made to produce a color image signal simply by imposing a color filter array over the sensor. The color filter array permits light of different colors to impinge on different picture elements (pixels) of the sensor in a fixed predetermined pattern. Typically one of the three colors (usually green) is most closely related to the luminance component of the image while the remaining two colors (usually red and blue) are most closely related to the chrominance components of the image. Using a single sensor necessarily reduces the resolution of each color component of the image, because sensor pixels dedicated to one color are in effect "missing" with respect to the other colors. Such "missing" pixels for a given color must therefore be inferred by interpolation in the reproduced image. Such interpolation can introduce into the reproduced image distortion objectionably visible to the human eye. The human eye is most sensitive to the luminance component of such distortion.

In order to minimize the perception of such distortion by the human eye and provide the most pleasing reproduced image, the resolution (or pixel density) of the luminance-related (e.g., green) pixels is increased at the expense of the chrominance-related (e.g., red and blue) pixels. Specifically, the color pattern of the color filter array is such that a majority of the sensor pixels receive the luminance-related (green) component of the light, while the remaining pixels receive the chrominance-related colors (e.g., red and blue). For example, a well-known color filter array (referred to as a 3G color filter array) consists of three rows of green pixels followed by a row of alternating red and blue pixels, so that ¾ of the pixels are green and the blue and red pixels each comprise ⅛ of the pixels.

In reproducing a color image from the signal generated by the image sensor and color filter array combination and computing the missing chrominance-related pixels, the distortion perceived by the human eye is further reduced by interpolating between the ratios of the chrominance-related (red and blue) pixels to the co-located green pixels. This approach succeeds in reducing the distortion detected by the human eye because it can be shown that it reduces the luminance component of the distortion (without necessarily reducing the overall distortion).

A further improvement is achieved by performing such color interpolation of intensity values using the logarithm of each pixel intensity rather than the pixel intensity itself. This feature improves the color fidelity in the reproduced image because of the non-linear relationships involved in combining color signals, which are well-known and need not be described herein. One advantage is that this feature permits interpolation of color difference signals rather than ratios, since, for example, $$\log R/G = \log R - \log G$$

and $$\log B/G = \log B - \log G.$$

All of the foregoing color image signal processing methods are described in U.S. patent application Ser. No. 384,353 filed 24 Jul. 1989 by Yusheng T. Tsai, Kenneth A. Parulski and Majid Rabbani entitled "A COMPRESSION METHOD AND APPARATUS FOR SINGLE SENSOR COLOR IMAGING SYSTEMS" and assigned to the assignee of the present invention. The referenced application describes how to employ such methods in an image compression system. In the referenced patent application, compression prior to interpolation of the missing pixels is disclosed. In the image compression system, the amount by which digital data representing each spatial frequency component of the image signal is compressed is varied so as to compensate for the contrast sensitivity function of the human eye, as described in U.S. Pat. No. 4,780,761 to Scott J. Daly et al. and assigned to the assignee of the present invention.

The green signal is preferably interpolated linearly because the green signal is the one most closely related to the luminance component. One problem with the foregoing techniques is that the red, green and blue signals must be transformed to logarithms in order to best interpolate the color difference signals. This ultimately requires a multiplicity of such transformations, representing a significant processing burden.

Another problem is that image processing, such as sharpening or edge enhancement, can increase the visibility of distortions introduced into the reproduced image by the compression-decompression process. A related problem is that the modulation transfer function introduced by the image display (such as a color video monitor or color paper printing) can affect the visibility of distortions introduced into the image by the compression-decompression process.

Still another problem is that the human eye contrast sensitivity function has a lower frequency response to the color difference signals than to the luminance-related green signal. While the prior art teaches sub-sampling color pixels with respect to luminance pixels to accommodate for this aspect of the human visual system, a better method is needed. This is particularly true in the case of the 3G color filter array, in which sub-sampling of the red and blue pixels is non-isotropic, being two times greater along the columns of the array than along the rows of the array.

Yet another problem is that such edge enhancement processes tend to objectionably over-emphasize image features which are already sufficiently sharp. It has seemed that this is an unavoidable penalty which accompanies edge enhancement of the image. Therefore, there is a need for an edge enhancement process which does not over-emphasize sufficiently sharp image features. A related problem is that a CCD image sensor introduces CCD charge transfer noise into its output signal in a non-isotropic manner which affects high spatial frequency texture or edge features lying along one axis of the image more than those lying along the other axis of the image. Edge enhancement tends to emphasize such noise.

Accordingly, it is an object of the invention to reproduce an image from a single sensor/color filter array combination without requiring any logarithmic transformations whatsoever.

It is a further object of the invention to perform all processing and compression of all components of the image signal in the same color space, thereby minimizing the number of required transformations.

It is another object of the invention to automatically compensate for the effects of the edge enhancement process and of the image display on the visibility of errors introduced by the compression/decompression image process.

It is still another object of the invention to provide different adaptive corrections in the compression-decompression processes for different (luminance-related and chrominance-related) components of the image best suited for the respective components.

It is a still further object of the invention to provide different adaptive corrections in the compression-decompression processes for different components of the image in accordance with the lower frequency response of the human visual system to the color difference signals and in accordance with the non-isotropic pattern of the green, red and blue pixels of the color filter array.

It is yet another object of the invention to provide an edge enhancement process which does not over-emphasize image features which are already sufficiently sharp and which does not require any transformation of the image data to another color space (e.g., a log or anti-log transformation). It is a related object of the invention to provide such an edge enhancement process which refrains from emphasizing CCD transfer noise affecting high spatial frequency image features along one axis without detracting from the edge enhancement of features lying along the other axis of the image.

DISCLOSURE OF THE INVENTION

In accordance with the present invention, the color pixel amplitudes from a single sensor having a color filter array are all transformed to $\Gamma$-space by raising them to the power of $1/\Gamma$, respectively, where $\Gamma$ is approximately 2.4. For example, if the color filter array provides red, green and blue (R,G,B) color pixel amplitudes, then the transformation provides the following $\Gamma$-space color signals: $R^{1/\Gamma}$, $G^{1/\Gamma}$, $B^{1/\Gamma}$. All operations such as color differencing, interpolation of those missing pixels required for color differencing, compression/decompression, edge enhancement and final interpolation of all missing pixels are performed in $\Gamma$-space without further transformation of the image signals. (This transformation has been used in other applications to achieve more faithful reproduction and less visible quantization noise in comparison with other methods which used the logarithm of the luminance, as described in "Uniform Perceptual Quantization: Applications to Digital Radiography" by Sezan, Yip and Daly, *IEEE Trans. Sys. Man. Cyber.* Vol. SNC-17 #4 1987 622–634.) The advantage realized in the present invention is the elimination of unnecessary transformation steps, so that the entire signal process is greatly simplified by performing every step in $\Gamma$-space and sources of error are reduced. In the preferred embodiment of the invention, the uninterpolated $\Gamma$-space image data is compressed for recording, storage or transmission and is later decompressed before the missing pixels are inferred by interpolation.

In the edge enhancement or image sharpening process of the invention, the $\Gamma$-space luminance-related signal (the green signal in the case of an RGB color signal) is sharpened by emphasizing high-spatial frequency image components along the vertical and horizontal axes independently without transforming the signal to another space. In order to avoid over-emphasizing high-spatial frequency image components which are unreliable or noisy due to the non-isotropic manner in which CCD transfer noise is introduced into the sensor output signal, a transversal blur or low-pass filter is imposed on the output of the vertical axis sharpening process before it is combined with the output of the horizontal axis sharpening process. In order to avoid over-sharpening features of the image which are already sufficiently sharp, the combined outputs of the horizontal and vertical sharpening processes are subjected to a paring process of the invention which suppresses strong high spatial frequency components as a function of their amplitude.

The invention compensates for the effects of the modulation transfer function of the edge enhancement process and the color image display device or media on the visibility of distortions introduced by the data compression process. This compensation is achieved in the data compression process, which requires that the image data be divided into blocks and each block be transformed to a block of spatial frequency coefficients. In accordance with the invention, the bit resolution of each spatial frequency coefficient is determined by dividing the coefficient by a corresponding normalization factor taken from an array of normalization factors. The array of normalization factors is determined by (in effect) cascading in the spatial frequency domain the human visual system contrast sensitivity function, an edge enhancement modulation transfer function and an image display modulation transfer function and inversing each element in the resulting cascaded transfer function to its reciprocal.

Preferably, the human visual contrast sensitivity function, the edge enhancement modulation transfer function and the display modulation transfer function each comprise an array of spatial frequency domain amplitude elements corresponding to a block of spatial frequency coefficients of the image data. The arrays thus formed are then cascaded. This is accomplished in a progressive manner by first determining from the parameters of position-to-spatial frequency transformation the number of cycles per block of each spatial frequency coefficient in the block. Next, the number of cycles per pixel is determined from the number of pixels per block for each spatial frequency coefficient in the block. This information is used to construct a corresponding array representing the edge enhancement modulation transfer function. Next, the number of cycles per unit distance is determined from the pixel spacing of the display for each spatial frequency coefficient in the block. This information is used to construct a corresponding array representing the image display or media modulation transfer function. Finally, the number of cycles per degree of visual scan is determined from the viewing distance characteristic of the display for each spatial frequency coefficient in the block. This information is used in the manner described in the above-referenced U.S. Pat. No. 4,780,761 to Scott J.

Daly et al. to construct a corresponding array (i.e. cascade) representing the human visual contrast sensitivity function. These three arrays are then multiplied together as a function of DCT array coefficient position, and the product is referred to as the cascade.

In accordance with a further aspect of the invention, the bandwidth of the human visual contrast sensitivity function is reduced for the color difference (R-G and B-G) signals in computing the normalization factors discussed immediately above. The advantage of this aspect of the invention is that it accommodates the reduced spatial frequency response of the human visual system to the color difference signals R-G and B-G. The normalization arrays thus generated for the R-G and B-G data blocks for the data compression process differ from the normalization array for the G data block in that they have a reduced frequency response and are non-isotropic due to the uneven distribution of red and blue pixels in the 3G color filter array. In the preferred embodiment, a further distinction of the R-G and B-G normalization arrays is that no compensation is made for the edge enhancement and image display modulation transfer functions.

All of the foregoing operations are performed on Γ-space R, G and B data without any intervening transformations.

BRIEF DESCRIPTION OF THE DRAWINGS

The invention is described below in detail by reference to the accompanying drawings, of which:

FIGS. 10a and 10b illustrate the data compression and data decompression processes performed by the systems of FIGS. 1 and 2, respectively;

FIG. 11 illustrates the spatial frequency transformation process performed by the data compressor of FIG. 10a in accordance with the present invention;

MODES FOR CARRYING OUT THE INVENTION

Figure 1:
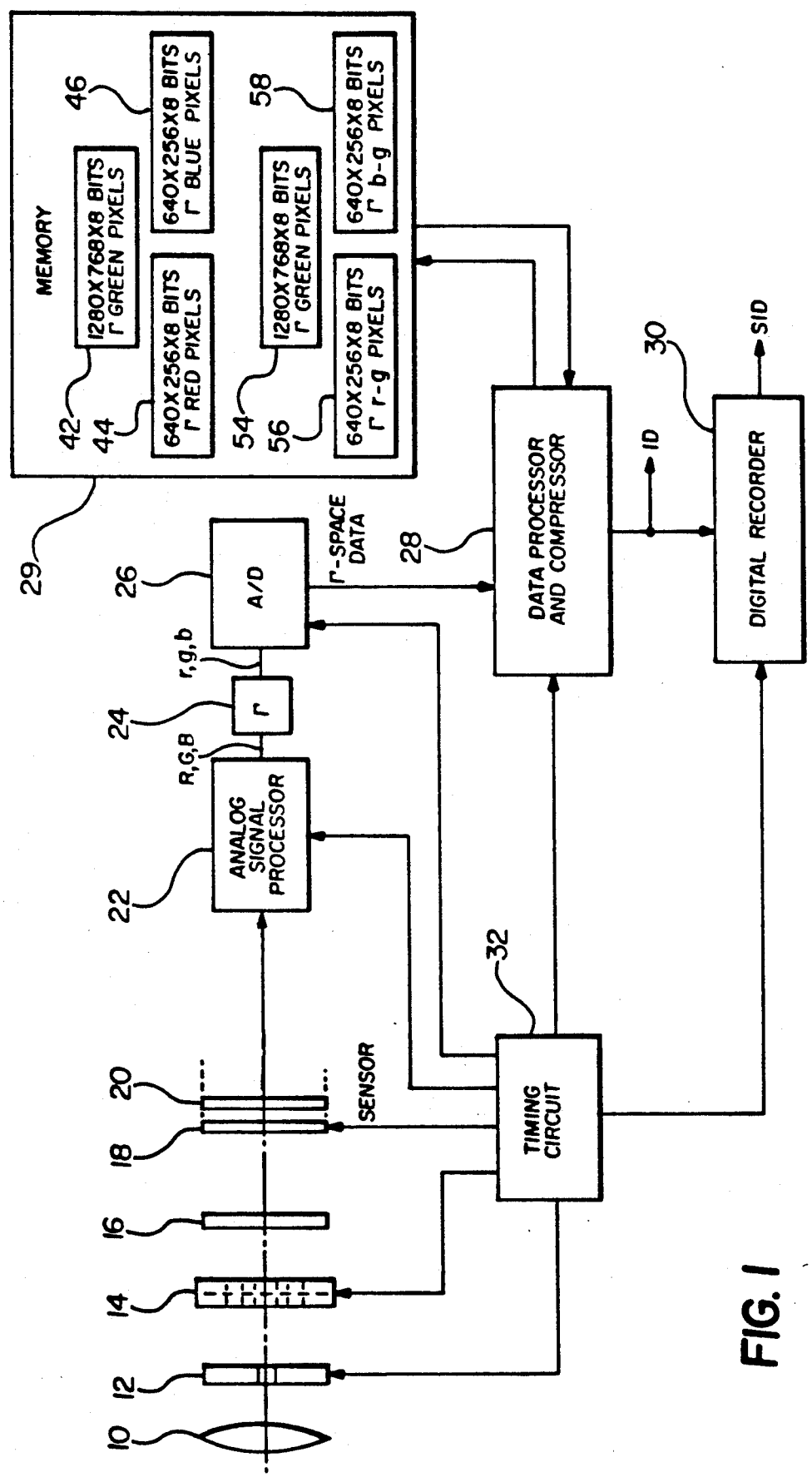
FIG. 1 is a block diagram of an image recording system embodying one aspect of the invention.

Referring to FIG. 1, an image capture or recording system embodying one aspect of the invention receives a light beam from a scene through a lens 10, an aperture 12 and a shutter 14. A blur filter 16 distributes the image in a nearly uniform manner across the image plane of a color filter array (CFA) 18 and an image sensor 20. The image sensor 20 may be a charge coupled device (CCD) of the type well-known in the art which produces an analog voltage for each one of an array of pixels in its image plane. The CFA 18 preferably is an array of red, green and blue filters overlying respective ones of the pixels of the sensor 20, so that the voltages produced by the sensor 20 represent R, G and B (red, green and blue) light intensity analog signals. The R, G and B analog image signals produced by the sensor 20 are amplified and processed by a conventional analog signal processor 22. The R, G and B analog signals are then transformed by raising them to the exponential power of 1/Γ in a conventional manner by a non-linear amplifier 24, to produce Γ-space analog image signals $r=R^{1/\Gamma}$, $g=G^{1/\Gamma}$, $b=B^{1/\Gamma}$. The r, g and b Γ-space analog signals are then converted to digital r, g and b data (e.g., 8-bit bytes) by an analog-to-digital converter 26. A data processor and compressor 28 temporarily stores the data in a memory 29 and then compresses the data. A digital recorder 30 records the compressed data on a digital storage medium such as a disk. The foregoing components are controlled by a conventional timing circuit 32.

Figure 2:
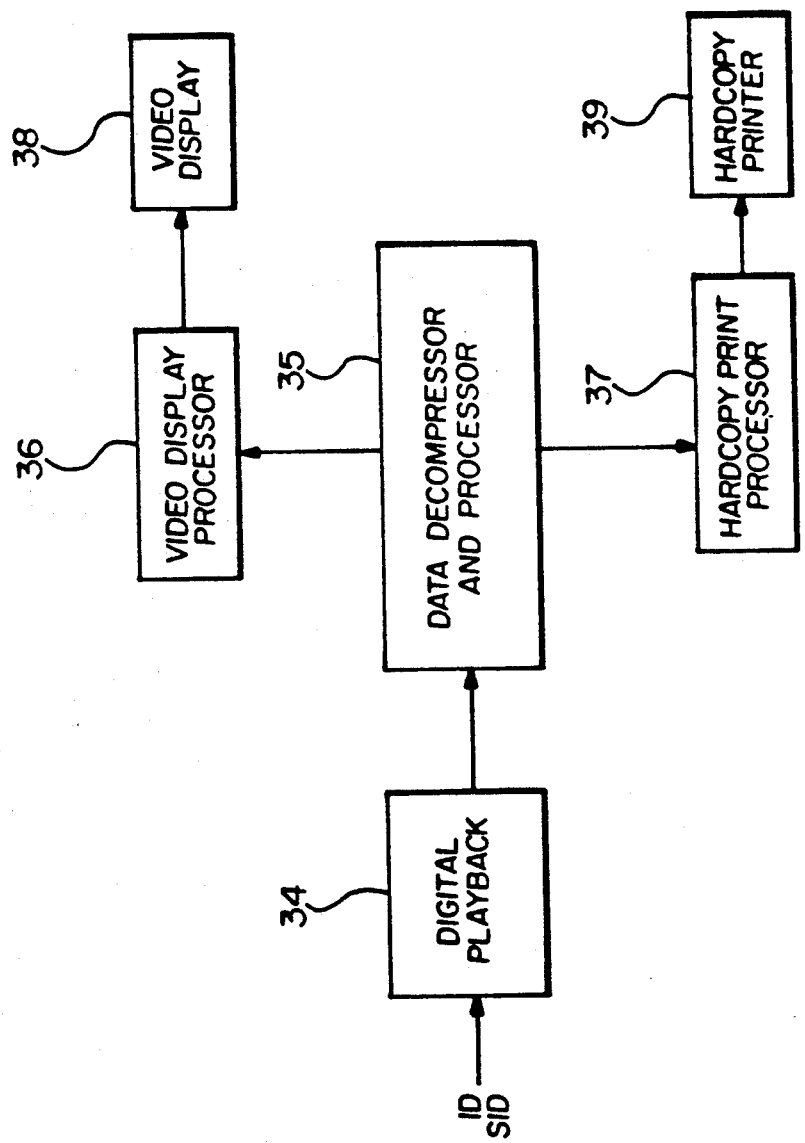
FIG. 2 is a block diagram of an image playback system embodying another aspect of the invention.

Referring to FIG. 2, an image playback or reproducing system embodying another aspect of the invention includes a digital playback device 34 (such as a disk player or digital memory read-out) and a data decompressor and processor 35. The digital playback device 34 receives either the stored image data SID recorded in the digital recorder 30 of FIG. 1 or receives image data ID directly from the data processor and compressor 28 of FIG. 1. The output of the decompressor 35 may be transmitted either to a video display processor 36 or to a hardcopy print processor 37. The output of the video processor 36 is transmitted to a color video display 38 while the output of the print processor 37 is transmitted to a hardcopy color printer 39.

Figure 3:
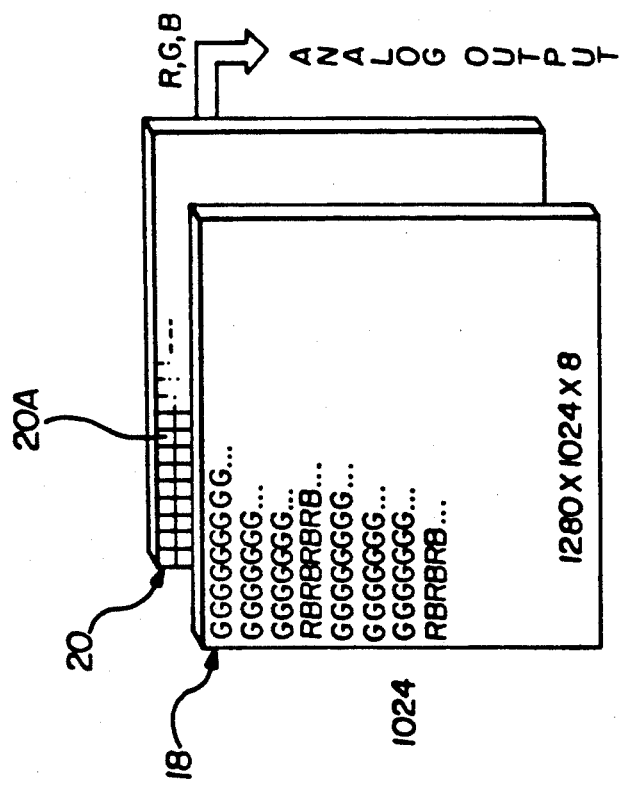
FIG. 3 is a block diagram of the color image sensing apparatus employed in the system of FIG. 1.

FIG. 3 illustrates the preferred apparatus for capturing the image. The CFA 18 is a "3G" CFA of the well-known type comprising 1024 rows and 1280 columns of discrete color filter pixels in which every fourth color filter pixel row contains alternate red and blue pixels while the remaining color filter pixels are green. The R, G and B pixels are in precise registration with respective light sensitive pixels 20A of the sensor 20. The sensor 20 likewise comprises 1024 rows and 1280 columns of light sensitive pixels 20A. If the A/D converter 26 of FIG. 1 produces 8-bit bytes, then 1024 rows and 1280 columns of 8-bit pixels represent the image captured by the sensor 20. However, it should be understood that the number of pixel rows and pixel columns, the number of bits per pixel and the particular color pattern of the CFA 18 are all design choices which may be varied in practicing the invention.

Transformation of the Image Signals to Γ-Space

Figure 4:
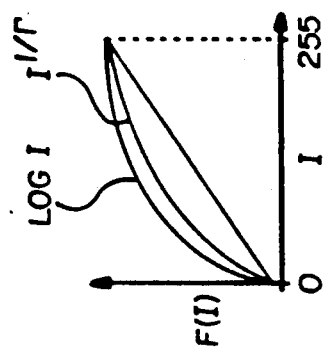
FIG. 4 is a graph of the Γ-space transformation employed in the invention.

FIG. 4 illustrates the behavior of the Γ-transformation from an intensity I to an intensity $I^{1/\Gamma}$. FIG. 4 also illustrates the log-transformation from I to log I for a pixel intensity I employed in the system of the patent application by Kenneth G. Parulski et al. referenced above. The Γ-transformation is somewhat more nearly linear than the log-transformation and it so happens to provide a superior result when combining or interpolating color difference signals. The main advantage of the Γ-space transformation discovered in the present invention, as will be described hereinbelow, is that no further transformations are required in processing the image signals, and all image signals (green, red and blue) are processed in the same color space (i.e., Γ-space), providing a significant economy of signal processing and computation.

Figure 5:
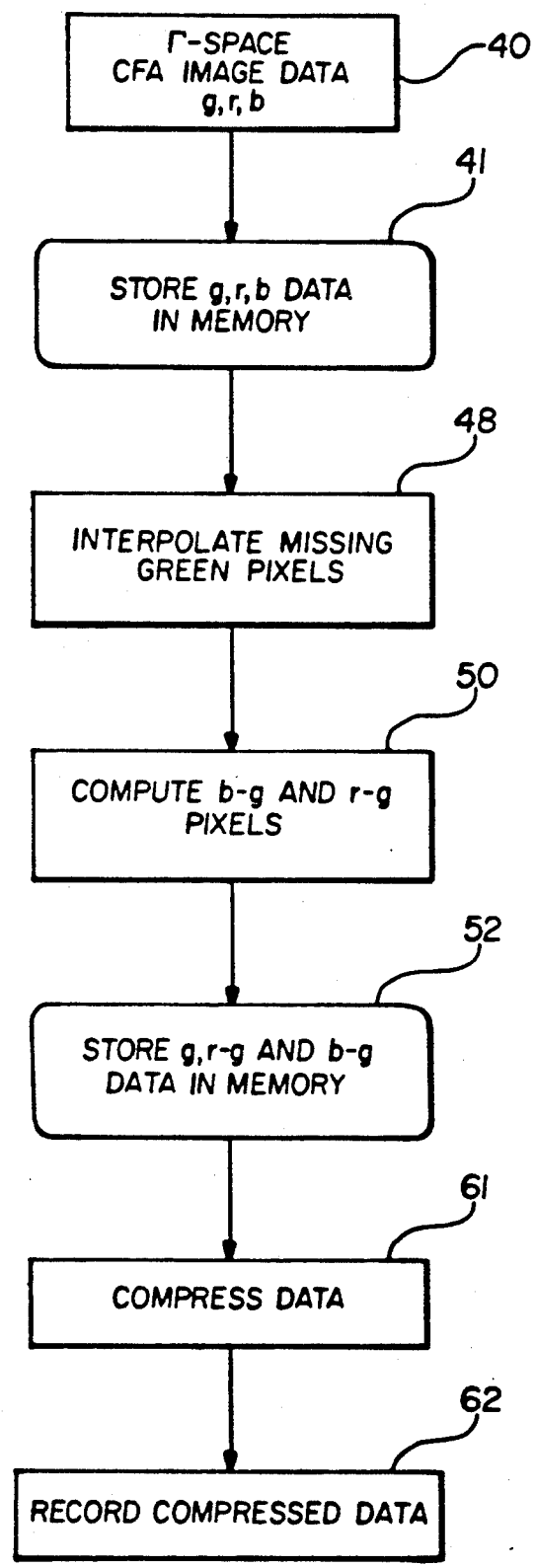
FIG. 5 is a flow diagram illustrating the image recording process performed by the system of FIG. 1.

FIG. 5 is a flow diagram depicting successive steps of the process performed by the data processor and compressor 28 of FIG. 1. The data processor 28 receives the Γ-space image data from the A/D converter 26 representing the image captured by the image sensor 20 (step 40 of FIG. 5). In step 41 of FIG. 5, the data processor 28 temporarily stores the data in the memory 29 in three separate memory blocks or color data planes (depicted in FIG. 1) comprising a data plane or memory block 42 of g (Γ-space green) pixels, a data plane or memory block 44 of r (Γ-space red) pixels and a data plane or memory block 46 of b (Γ-space blue) pixels. In the preferred embodiment, the g pixel memory block 42 has 1280 columns by 768 rows of 8-bit bytes, while each one of the b pixel and r pixel blocks 44 and 46 has 640 columns by 256 rows of 8-bit bytes.

Compression Noise Reduction by Refraining from Filling In Certain Missing Pixels In each pixel column of the image captured by the image sensor 20, every fourth green pixel is missing (as shown in FIG. 3), so that the missing green pixels must be filled in by vertical interpolation. In alternate pixel columns of the captured image, only every fourth red pixel is present at the site of a missing green pixel. In the remaining columns of the captured image, only every fourth blue pixel is present. Therefore, the red and blue pixels must be interpolated both horizontally and vertically to fill in the missing red and blue pixels. However, it is a discovery of the invention that by refraining from filling in the missing pixels until after the image has been compressed, recorded, played back and then decompressed, noise in the reproduced image is significantly decreased in comparison with the alternative method in which the missing pixels are filled in prior to compression and recording. This discovery may be confirmed analytically in accordance with statistical methods.

In the case of the green image, the missing pixels comprise ¼ of all green pixels and the compression noise is reduced in accordance with the foregoing method of filling in missing pixels after decompression by about 12.5% in the decompressed green pixels. As mentioned previously herein, the red and blue pixels each comprise only ⅛ of all pixels in the image and, as will be discussed below, the red and blue pixels are stored and compressed in Γ-space as the Γ-space color difference signals r-g and b-g. It can be shown that by refraining from filling in r-g and b-g color difference signals of the missing red and green pixels prior to decompression, the compression noise is reduced in the decompressed color difference signals on the order of 60%.

Producing the Γ-Space Color Difference Signals for Compression

Referring again to FIG. 5, the data processor 28 does not fill in the missing red and blue pixels prior to compression, in accordance with the foregoing discussion. However, the data processor 28 produces the Γ-space color difference signals r-g and b-g prior to compression for those red and blue pixels which are not missing. In order to accomplish this, the missing green pixels are computed at the site of each red or blue pixel. The missing green pixels $g_{miss}$ are filled in (step 48 of FIG. 5) by interpolating the Γ-space green pixel data in each column, in the following column pattern of the 3G CFA 18:

$g_1$
$g_2$
$g_3$
$g_{miss}$
$g_4$
$g_5$
$g_6$ using the following center-weighted average:

$$g_{miss} = A \times g_1 + B \times g_2 + C \times g_3 + C \times g_4 + B \times g_5 + A \times g_6$$

where:

$$A < B < C.$$

In a preferred embodiment:
A = 0.218
B = 0.563
C = 0.844.

In step 50 of FIG. 5, the data processor 28 computes the Γ-space color difference signals r-g and b-g only for those red and blue pixels present in the CFA array, thereby refraining from filling in any missing red or blue pixels prior to compression. Thus, in step 50 the data processor 28 subtracts from each Γ-space red pixel value r the Γ-space value $g_{miss}$ of the corresponding missing green pixel to form the r-g color difference data. Likewise, the processor 28 also subtracts from each Γ-space blue pixel value b the Γ-space value $g_{miss}$ of the corresponding missing green pixel to form the b-g color difference data. The operation of step 50 may be summarized for the $i^{th}$ red or blue pixel as follows:

$$(r-g)_i = r_i - g_{r(miss)} \text{ and}$$

$$(b-g)_i = b_i - g_{b(miss)}$$

where $(r-g)_i$ is the value of the $i^{th}$ r-g color difference pixel, $r_i$ is the value of the $i^{th}$ Γ-space red pixel and $g_{r(miss)}$ is the interpolated Γ-space value of the missing green pixel at the site of the $i^{th}$ red pixel. Also, $(b-g)_i$ is the value of the $i^{th}$ b-g color difference pixel, $b_i$ is the value of the $i^{th}$ Γ-space blue pixel and $g_{b(miss)}$ is the interpolated Γ-space value of the missing green pixel at the site of the $i^{th}$ blue pixel.

In step 52, the color difference data generated in step 50 is stored with the uninterpolated green pixel data in the memory 29 in three separate memory blocks or color data planes (shown in FIG. 1), comprising a memory block 54 of 1280 columns and 768 rows of 8-bit bytes representing the Γ-space green pixels, a memory block 56 of 640 columns and 256 rows of 8-bit bytes comprising the Γ-space r-g color difference data and a memory block 58 of 640 columns and 256 rows of 8-bit bytes comprising the b-g color difference data. The data representing the missing green pixels which were filled in to generate the color difference data is then discarded.

In step 61 of FIG. 5, the data processor 28 separately compresses the data stored in each of the memory blocks 54, 56, 58 of FIG. 1. The digital recorder 30 records the compressed data on data storage media in step 62.

Figure 6:
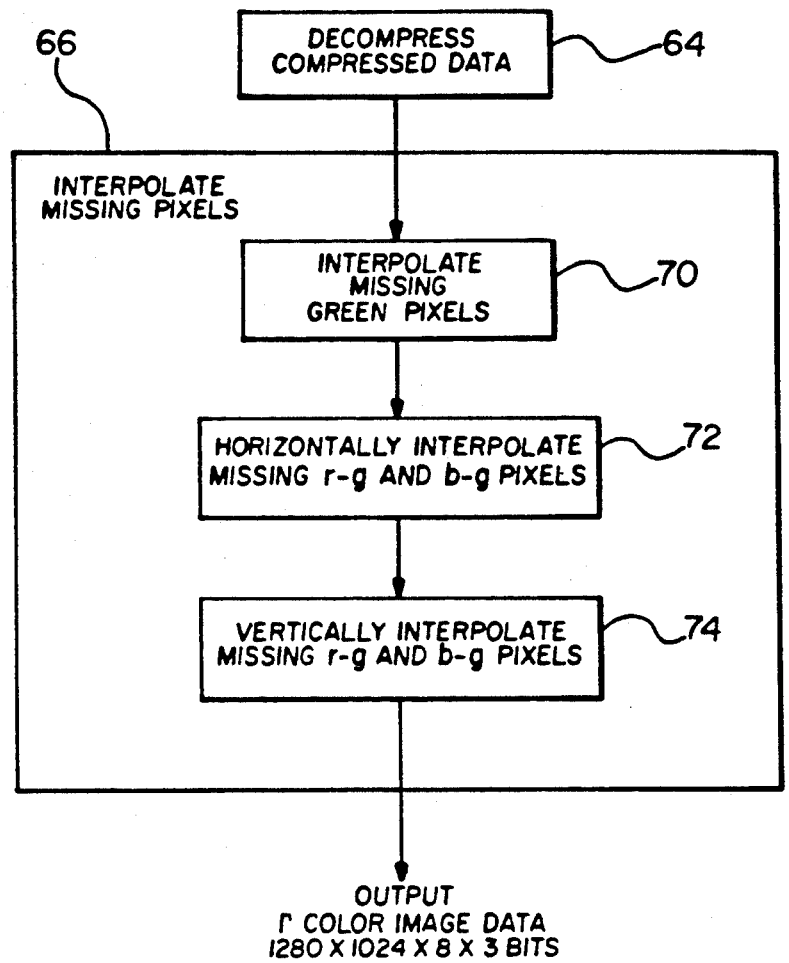
FIG. 6 is a flow diagram illustrating the image playback process performed by the system of FIG. 2.
Figure 7:
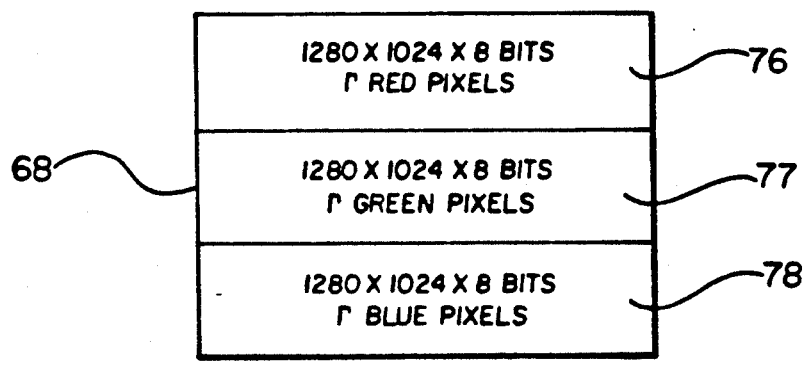
FIG. 7 is a block diagram depicting the three interpolated color data blocks produced by the process of FIG. 6.

FIG. 6 is a flow diagram depicting successive steps of the playback process performed by the data processor 35 of FIG. 2. The compressed data from the playback device 34 corresponds to the uncompressed data planes or blocks 54, 56, 58 of FIG. 1. This data is decompressed by the data processor 35 in step 64 of FIG. 6 using the inverse of the compression process performed by the data processor 28 of FIG. 1 to produce decompressed data corresponding to the color data planes or memory blocks 54, 56, 58 of FIG. 1. Then, in step 66 the missing green, red and blue pixels are computed by interpolation of the green (g) data and the r-g and b-g color difference data to form a block 68 of Γ-space color image data illustrated in FIG. 7 having no missing pixels. The interpolation step 66 of FIG. 6 consists of three steps: the missing green pixels are first filled in by vertical interpolation (step 70 of FIG. 6), then missing color difference (r-g and b-g) pixels are horizontally interpolated (step 72 of FIG. 6) and then vertically interpolated (step 74 of FIG. 6). Referring to FIG. 7, the block 68 comprises three arrays or color data planes 76, 77, 78 each consisting of 1280 columns and 1024 rows of 8-bit bytes representing the Γ-space red, green and blue pixels, respectively.

The green pixel interpolation step 70 of FIG. 6 is carried out in the same manner as the green pixel interpolation step 48 of FIG. 5. The horizontal interpolation step 72 of FIG. 6 fills in the missing red and blue pixels of every fourth pixel row of alternating r-g and b-g pixels in the decompressed image data recovered by the decompression step 64. In every fourth pixel row of the decompressed data, a typical sequence of Γ-space r-g pixels is:

$$(r-g)_1; (r-g)_{miss}; (r-g)_2; \ldots,$$

while a typical sequence of Γ-space b-g pixels is:

$$(b-g)_1; (b-g)_{miss}; (b-g)_2; \ldots,$$

where the subscript "miss" denotes a missing pixel. The corresponding sequence of red and blue pixels in every fourth row of the CFA 18 of FIG. 3 is as follows:

$$r_1, r_{miss}, r_2, \ldots \text{ and}$$

$$b_1, b_{miss}, b_2, \ldots$$

where $r_{miss}$ and $b_{miss}$ are the missing red and blue pixels in the CFA pattern. The horizontal interpolation of the missing Γ-space red and blue pixels using the decompressed r-g and b-g Γ-space data is as follows:

$$r_{miss} = g_{rmiss} + 0.5 \times [(r-g)_1 + (r-g)_2] \text{ and}$$

$$b_{miss} = g_{bmiss} + 0.5 \times [(b-g)_1 + (b-g)_2],$$

where $g_{rmiss}$ and $g_{bmiss}$ are the green pixels at the sites of the missing red and blue pixels $r_{miss}$ and $b_{miss}$, respectively. Of course, no such interpolation is necessary in computing (from the color difference signals) any red and blue pixels $r_1$ and $b_1$ which are not missing:

$$r_1 = g_{r1} + (r-g)_1 \text{ and}$$

$$b_1 = g_{b1} + (b-g)_1,$$

where $g_{r1}$ and $g_{b1}$ are the interpolated missing green pixels at the site of $r_1$ and $b_1$ respectively and $(r-g)_1$ and $(b-g)_1$ are the color difference signals corresponding to $r_1$ and $b_1$.

The vertical interpolation step 74 of FIG. 6 fills in the missing red and blue pixels that occur in every three out of four pixel rows. Following the horizontal interpolation step of block 72, the Γ-space red and blue pixels have the following patterns for each pixel column:

| $r_1$ | $b_1$ |
| $r_{(miss)1}$ | $b_{(miss)1}$ |
| $r_{(miss)2}$ | $b_{(miss)2}$ |
| $r_{(miss)3}$ | $b_{(miss)3}$ |
| $r_2$ | $b_2$. |

The missing red pixels are vertically interpolated in Γ-space in step 74 by adding corresponding green pixels to color difference signals weighted in accordance with their proximity to the missing red pixels, as follows:

$$r_{(miss)1} = g_{r(miss)1} + A \times (r_1 - g_1) + B \times (r_2 - g_2)$$

$$r_{(miss)2} = g_{r(miss)2} + C \times (r_1 - g_1) + D \times (r_2 - g_2)$$

$$r_{(miss)3} = g_{r(miss)3} + E \times (r_1 - g_1) + F \times (r_2 - g_2),$$

where $g_{r(miss)i}$ is the Γ-space value of the green pixel at the site of the $i^{th}$ missing red pixel $r_{(miss)i}$, and $g_1$ and $g_2$ are the interpolated missing green pixel values at the sites of the red pixels $r_1$ and $r_2$. Preferably, in step 74, $A = F = 0.75$, $C = D = 0.5$ and $B = E = 0.25$. The missing blue pixels are vertically interpolated in the same manner.

In summary, all of the pre-compression signal processing including the computation of the color difference signals, the compression, the decompression and the post-decompression processing including the interpolation of all missing red, green and blue pixels is carried out in Γ-space, no interim transformations of the data being necessary. The elimination of all interim transformations provides a significant advantage in processing speed, economy of hardware and image quality.

Γ-Space Edge Enhancement Process

Figure 8:
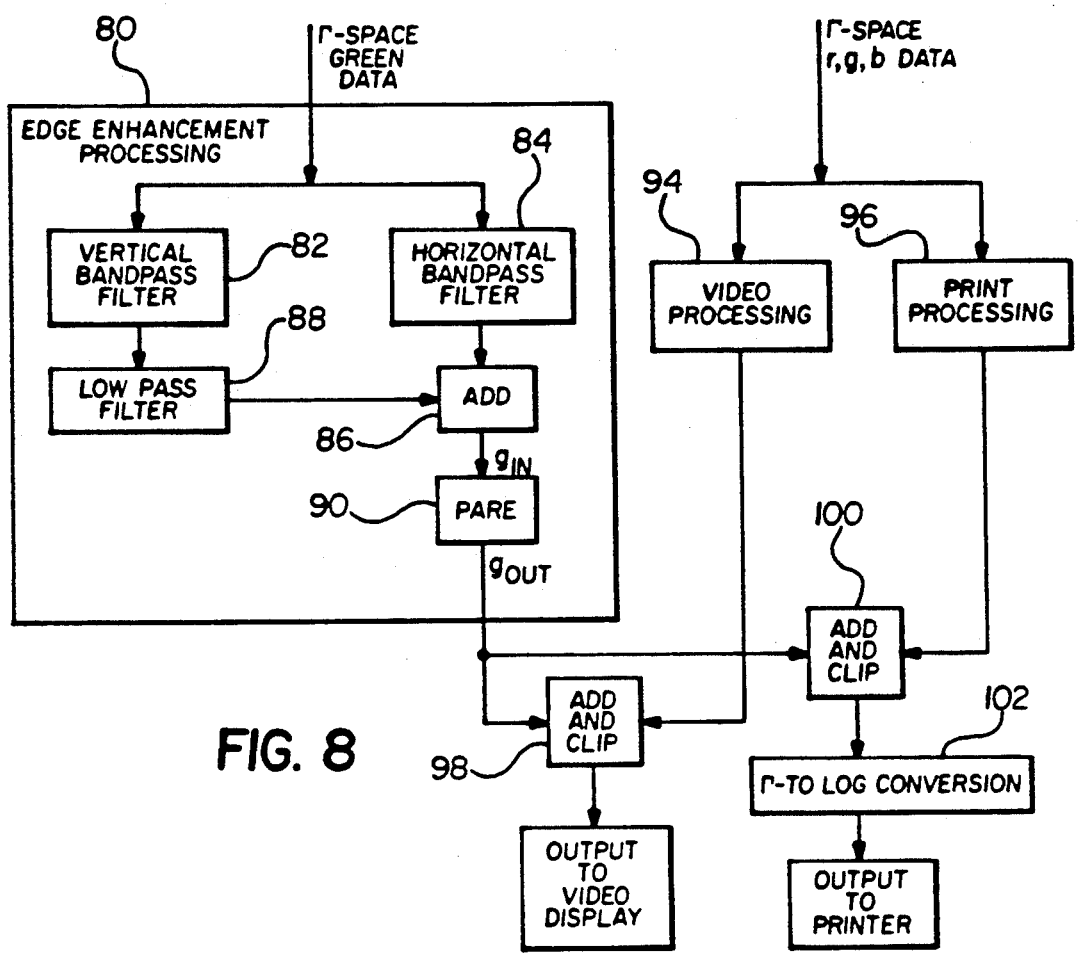
FIG. 8 is a block diagram illustrating the edge enhancement process and playback image processes performed by the system of FIG. 2.

Upon the completion of the de-compression and interpolation processes of FIG. 6, the data processor 35 of FIG. 2 enhances or sharpens the Γ-space data of FIG. 7 representing the interpolated red, green and blue pixels in accordance with a Γ-space edge enhancement process of the invention. The data is prepared in a conventional manner for video display by the video processor 36 or prepared in a conventional manner for print-out by the print processor 37. The edge enhancement process, the video processing and the print processing are illustrated in FIG. 8. As illustrated in FIG. 8, much of the edge enhancement process is performed in parallel with the conventional video processing or in parallel with the conventional print processing.

The Γ-space edge enhancement process 80 of FIG. 8 requires as an input only the luminance-related (green) Γ-space data (i.e., block 77 of FIG. 7). This process begins with two separate bandpass filtering steps carried out simultaneously, namely a vertical bandpass filtering step 82 and a horizontal bandpass filtering step 84. The bandpass filtering steps 82, 84 extract high spatial frequency components from the image which are to be added back into the original image to boost their amplitude in the original image, thereby sharpening the image. Using conventional transversal filtering techniques, the vertical bandpass filter step 82 computes a new value for each Γ-space green pixel based upon the value of neighboring pixels within the same column as the current pixel being processed. The vertical bandpass filter step 82 does this for each pixel in a given column and for each column of Γ-space green pixels in the data block 77 of FIG. 7.

In similar manner and using conventional transversal filtering techniques, the horizontal bandpass filter step 84 computes a new value for each Γ-space green pixel based upon the value of neighboring pixels within the same row as the current pixel being processed. The horizontal bandpass filter step 84 does this for each pixel in a given row and for each row of Γ-space green pixels in the data block 77 of FIG. 7. For each pixel, the new Γ-space value computed for it by the vertical bandpass filter step 82 and the new Γ-space value computed for it by the horizontal bandpass filter step 84 are combined by an adding step 86 to produce a two-dimensionally bandpass filtered Γ-space pixel value reflecting the results of both the vertical and horizontal bandpass filter steps 82, 84.

One problem encountered in boosting the high spatial frequency image components is that more noise will be boosted along one axis than along the other. This is particularly true of images produced by a typical CCD imaging array due to the row-by-row charge transfer process by which an image signal is extracted from the CCD array. In order to solve this problem, a low pass filter step 88 is interposed between the output of the vertical bandpass filter step 82 and the adding step 86. Preferably, using conventional transversal filtering techniques, the low pass filter step 88 computes a low pass filtered Γ-space value for each pixel based upon the two neighboring pixels immediately preceding and following the current pixel in the data stream using the coefficient sequence 1-2-1. Thus, in a vertical column or sequence of three green pixels, $g_1$, $g_2$, $g_3$, the low pass filtered Γ-space value of $g_2$ is computed as follows:

$$g_2 = 1 \times g_1 + 2 \times g_2 + 1 \times g_3.$$

Other suitable filter coefficient sequences may be selected by the skilled worker.

Figure 9:
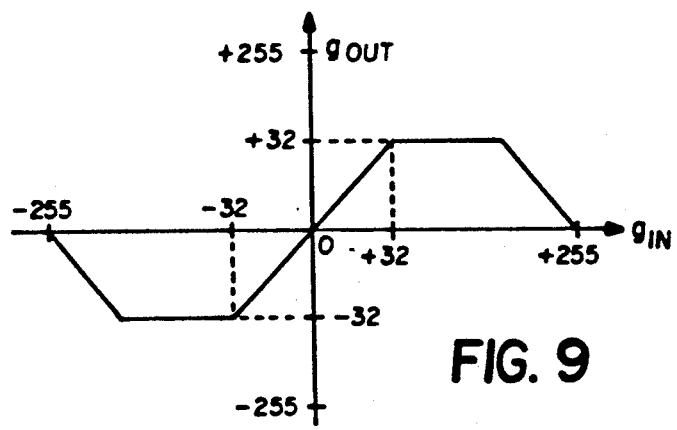
FIG. 9 is a graph illustrating the response of a paring filter in the edge enhancement circuit of FIG. 8.

Another problem with edge enhancing the image is that image features which are already very sharp may be further sharpened to an undesirably exaggerated degree. In order to solve this problem, the Γ-space image data produced by the adding step 86 is "pared" by a paring or filtering step 90. As used herein, paring refers to high amplitude attenuation. The non-linear transfer function of the paring step 90 is illustrated in FIG. 9 for an input amplitude range of 0 to 255 for 8-bit data. The input signal is $g_{in}$ and the output signal is $g_{out}$. Essentially, for input amplitudes of absolute value zero through 32, a unity gain is provided. The absolute value of $g_{out}$ never exceeds 32 in this embodiment. For input amplitudes above an absolute value 32, the gain rapidly falls below unity until zero gain is reached at maximum input absolute value 255. Thus, for the highest amplitude high spatial frequency components (e.g., very sharp and contrasting edges) virtually no sharpening is performed because they are not boosted, a significant advantage.

As will be described below, the enhanced or sharpened image or array of pixel values thus produced at the output of the paring step 90 is combined with all three blocks or planes of color data (red and blue as well as green).

In the video processing step 94 performed by the video processor 36 of FIG. 2 and in the print processing step 96 performed by the print processor 37 of FIG. 2, the Γ-space r, g and b data is back-transformed to linear space (by computing the F power of the amplitude of each Γ-space pixel). Then, the video processing step 94 and the pre-print processing step 96 employ conventional techniques to prepare the resulting R,G,B signal for output to a video display or printer, respectively. In particular, the color signals must be adjusted in accordance with the particular color response of the video monitor or the printer/print media. In the case of the printer and media, a further adjustment must be made to perform density correction using conventional techniques. The video processing step 94 and the pre-print processing step 96 then back-transform their color adjusted data to Γ-space. The Γ-space green, red and blue pixel values output by the video processing step 94 are each combined in an adding and clipping step 98 with the corresponding sharpened pixel values output by the edge enhancement process 80 so that the video-processed green, red and blue video color images are each individually sharpened. The resulting video processed data is then sent to a color video display device. The Γ-space green, red and blue pixel values output by the print processing step 96 are each combined in an adding and clipping step 100 with corresponding sharpened pixel values output by the edge enhancement process 80, so that the print processed green, red and blue images are each individually sharpened. The resulting print processed image data is transformed in step 102 to another space compatible with a printer (such as log) and sent to a printer.

Cascaded Modulation Transfer Functions for Controlling Bit Resolution of Each Component of the Compressed Image In order to solve the problem of the edge enhancement process making the compression-induced noise more visible in the image to the human eye, the edge enhancement process modulation transfer function is taken into account along with the human visual contrast sensitivity function in computing normalization factors which determine the bit resolution (i.e., number of representative bits) of respective spatial frequency components of the compressed data produced by step 61 of the process of FIG. 5. In order to compensate for the effect of the video display on the visibility to the human eye of compression-induced noise in the image, the display modulation transfer function is also taken into account in computing the normalization factors. In general, the modulation transfer functions of any steps in the image recording/playback process tending to affect visibility to the human eye of compression noise may be cascaded together with the human visual contrast sensitivity function in accordance with the invention to generate an array of normalization factors for the compression process. This will now be described with reference to the compressing step 61 of FIG. 5 performed by the data compressor 28 of FIG. 1 and further with reference to the decompressing step 64 of FIG. 6 performed by the data decompressor 35 of FIG. 2.

Figure 10A:
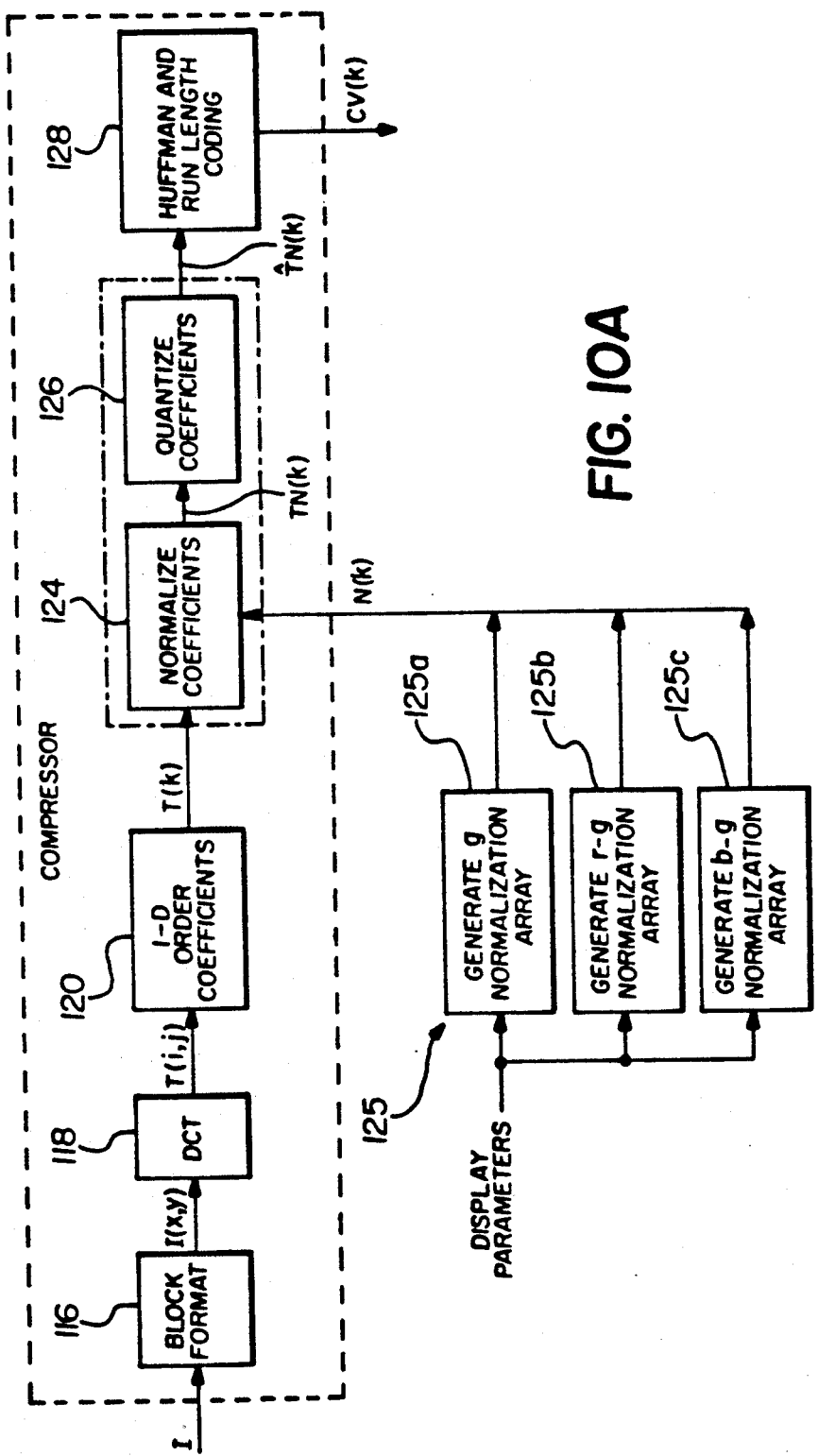

FIG. 10a illustrates in detail the compression process performed in step 61 of FIG. 5 by the data processor 28. This process begins by taking an individual one of the g, r-g or b-g Γ-space memory blocks or color data planes 54, 56, 58 (of FIG. 1) and dividing it into many small transform blocks of pixels (step 116 of FIG. 10a). This step is depicted in further detail in FIG. 11. In the preferred embodiment, each small transform block has 16 rows and 16 columns of pixels I(x,y). Referring again to FIG. 10a, each 16-by-16 transform block thus generated is transformed by a discrete cosine transform (DCT) step 118, to generate a 16-by-16 block of DCT coefficients T(i,j). The DCT coefficient block is sequentialized in step 120 to a stream of DCT coefficients T(k). The number of encoded bits which will represent each coefficient in the compressed data is then determined by a normalization step 124 and a quantization step 126. The normalization step 124 consists of dividing each DCT coefficient T(k) in the sequentialized 16-by-16 DCT block by a normalization factor generated for that particular coefficient by a normalization array generating step 125. The normalization step 124 produces a normalized coefficient TN(k). The number of encoded bits which will represent the compressed version of the particular coefficient is inversely proportional, approximately, to the amplitude of the normalization factor. The quantization step 126 quantizes each normalized coefficient TN(k) to produce a quantized coefficient T̂N(k). The normalized and quantized DCT coefficients T̂N(k) are then minimum-redundancy (Huffman) encoded and run-length encoded in step 128 to produce the encoded bits comprising compressed DCT coefficients CV(k), which completes the compression process. As described in the above-referenced U.S. Pat. No. 4,780,761 to Scott J. Daly et al., the normalization array generating step 125 generates a 16-by-16 array of normalization factors N(k) associated with the 16-by-16 block of DCT coefficients in such a manner as to compensate for the human visual contrast sensitivity function. In accordance with the present invention, the normalization array generating step 125 further compensates for the modulation transfer functions of the edge enhancement process (or any other image signal process as desired) and of the image display, as will be described below.

FIG. 10b illustrates in detail the decompression process performed in step 64 of FIG. 6 by the data processor 35. In the first step of this process (step 130 of FIG. 10b), the compressed DCT coefficients CV(k) are decoded in accordance with the minimum redundancy (Huffman) codes and run length codes to produce the normalized coefficients T̂N(k). The normalized coefficients are denormalized in step 132 to produce the DCT coefficients T(k). The denormalization step 132 is accomplished by multiplying each DCT coefficient by the same normalization factor by which it was previously divided in the compression process. For this purpose, the normalization array generating step 125 of the compression process of FIG. 10a is repeated as the normalization array generating step 125' in the decompression process of FIG. 10b. In one embodiment, the normalization generating step 125' of FIG. 10b furnishes the reciprocals $N^{-1}(k)$ of the normalization factors. The DCT coefficients T(k) are then reformatted into a 16-by-16 block T(i,j) in step 136 and inverse DCT transformed in step 138 to a 16-by-16 image block I(x,y). The image blocks thus generated are assembled together in step 140 to form the reproduced g, r-g, or b-g image.

Figure 12:
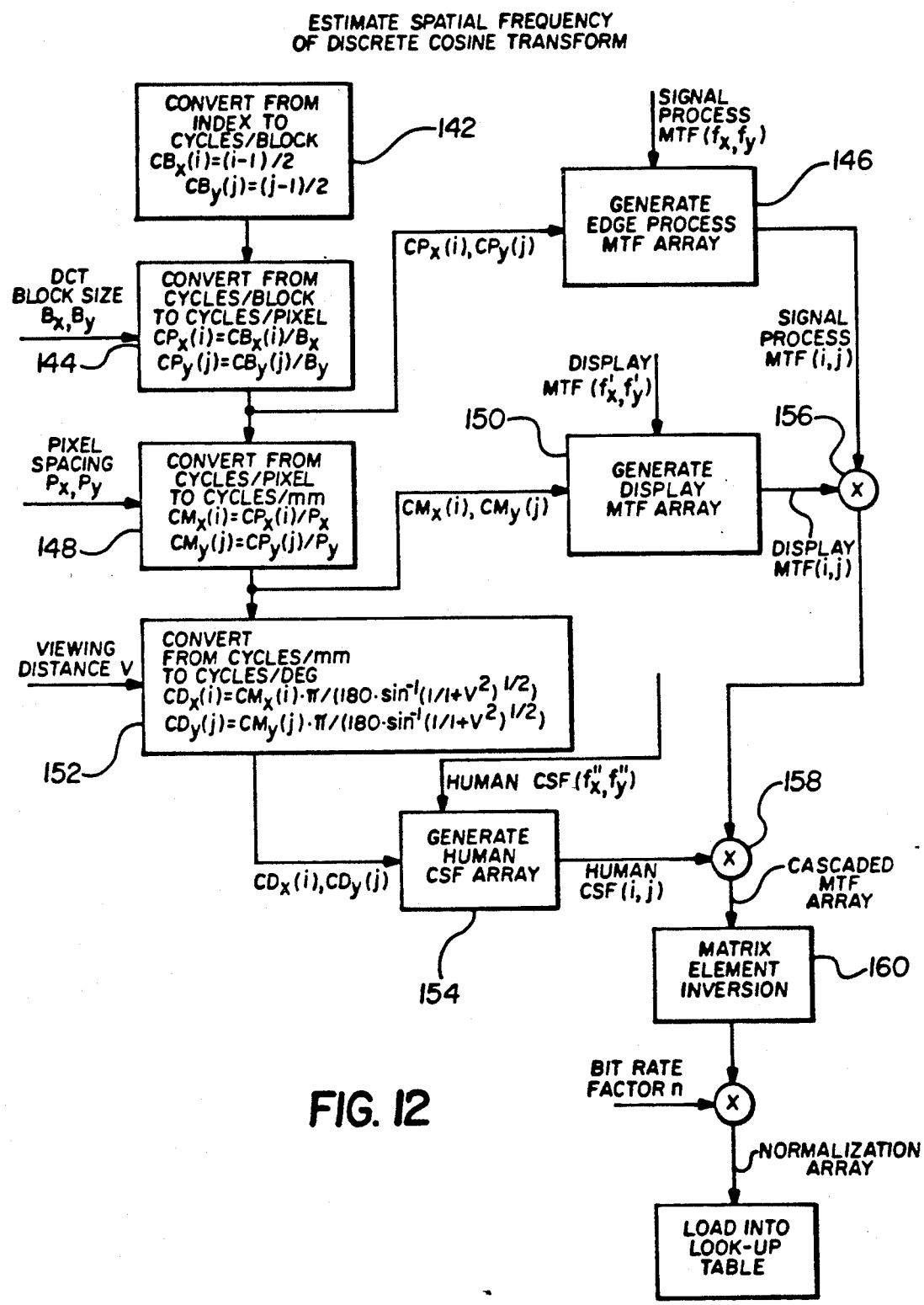
FIG. 12 illustrates the cascading of the human visual contrast sensitivity function with modulation transfer functions of the edge enhancement process and of the image display in generating the normalization arrays employed in the data compression process of FIG. 10a and in the decompression process of FIG. 10b.
Figure 13A:
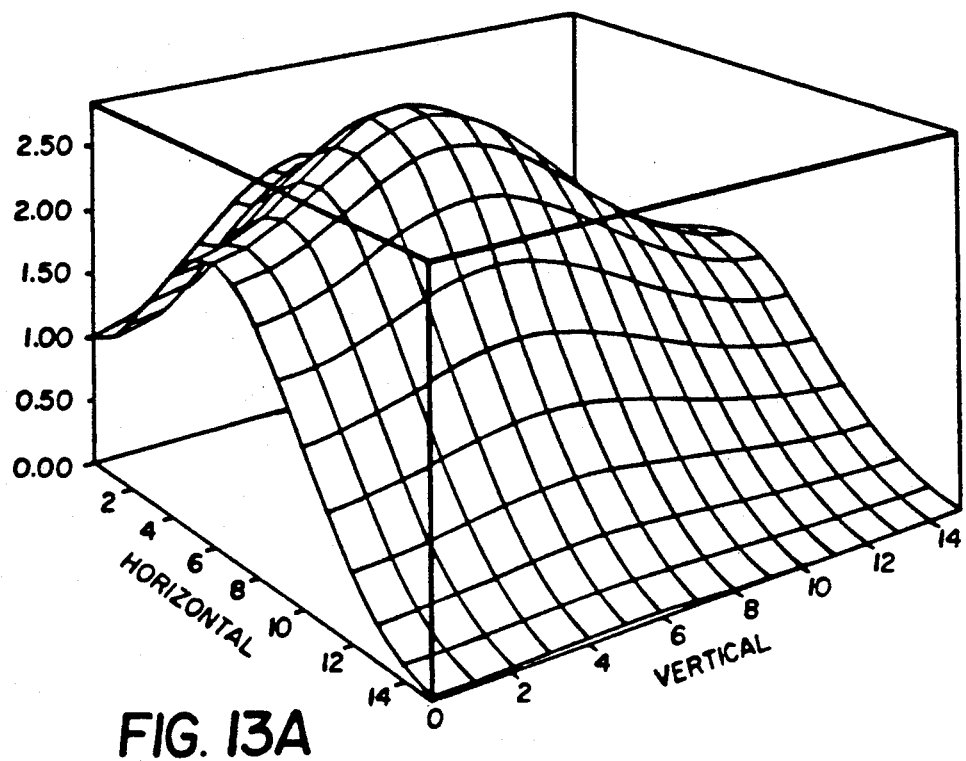
FIGS. 13a, 13b, 13c and 13d illustrate arrays representing, respectively, the edge enhancement modulation transfer function, the display modulation transfer function, the human visual contrast sensitivity function and an array formed by cascading the foregoing arrays.

FIG. 12 illustrates how the normalization array generating step 125 cascades the different modulation transfer functions and the human contrast sensitivity function to form the normalization array N(k). In essence, the predominant spatial frequency of each DCT coefficient in the 16-by-16 block is estimated in different units suitable for correlation with modulation transfer functions of different processes (namely, the edge enhancement process, the image display process and the human visual perception process). The first step (step 142 of FIG. 12) is to compute the frequency in cycles per block of each DCT coefficient based upon the specific parameters employed in the discrete cosine transform used to generate the DCT coefficients. Next, in step 144 of FIG. 12 the number of cycles per pixel is computed from the number of cycles per block for each DCT coefficient and from the number of pixel rows ($B_x$) and columns ($B_y$) in each block, which in the preferred embodiment is 16 rows and 16 columns. The two-dimensional modulation transfer function of the edge enhancement process of FIG. 8 is readily generated by the skilled worker using ordinary techniques and is best expressed in the dimension of step 144, namely cycles per pixel. The results of step 144 are exploited in step 146 by associating an amplitude from the edge enhancement modulation transfer function with each DCT coefficient based upon its predominant spatial frequency in cycles per pixel. This produces a 16-by-16 edge enhancement modulation transfer function array. In FIG. 13a, the shape of the three dimensional surface corresponds to the two dimensional modulation transfer function of the edge enhancement process 80 FIG. 8. The intersection points in the grid superimposed on the three dimensional surface of FIG. 13a are the amplitudes associated with the individual DCT coefficients in step 146.

Figure 13B:
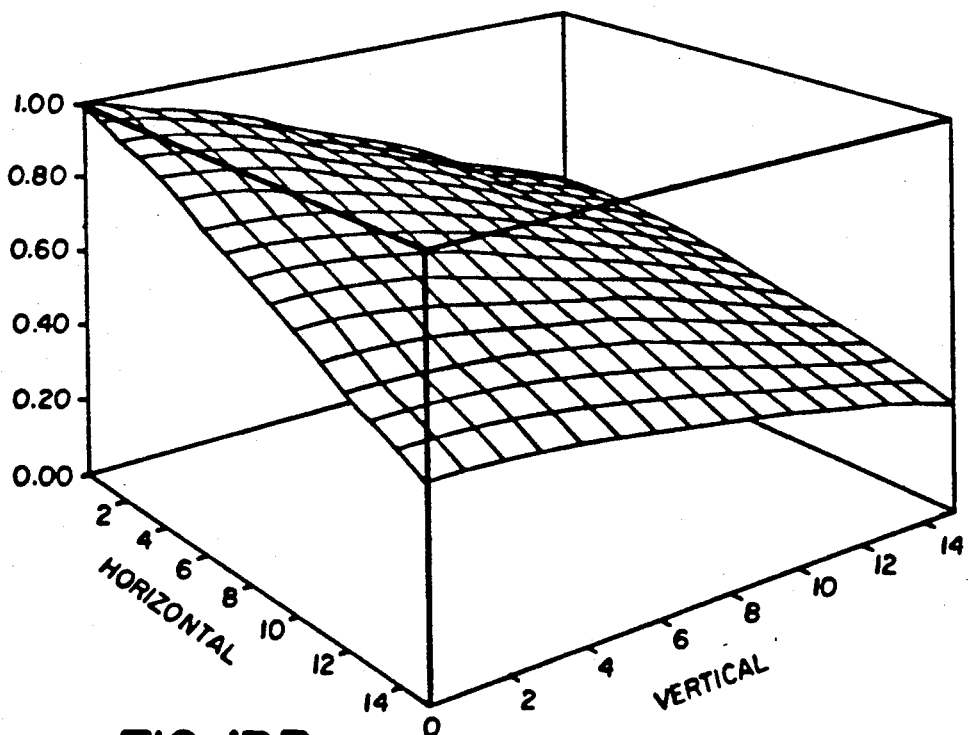

Next, in step 148 of FIG. 12 the number of cycles per unit distance (e.g., millimeters) is computed for each DCT coefficient from the number of cycles per pixel and from the pixel-to-pixel spacing Px, Py of the CFA 18 of FIG. 3 for example. The two-dimensional modulation transfer function of the image display is readily generated by the skilled worker using ordinary techniques from the known characteristics of the image display (video monitor or print media) to be employed and is best expressed in units of cycles per unit distance (millimeters). This follows from the fact that the perception of texture and edges in printed media, for example, is affected by the pixel spacing on the media. Then, step 150 exploits the results of step 148 by associating an amplitude from the display modulation transfer function with each DCT coefficient based upon its spatial frequency in cycles per millimeter. This produces a 16-by-16 image display modulation transfer function array. In FIG. 13b, the shape of the three dimensional surface corresponds to the two dimensional modulation transfer function of the image display. The intersection points in the grid superimposed on the three dimensional surface of FIG. 13b are the amplitudes associated with the individual DCT coefficients in step 150.

Figure 13C:
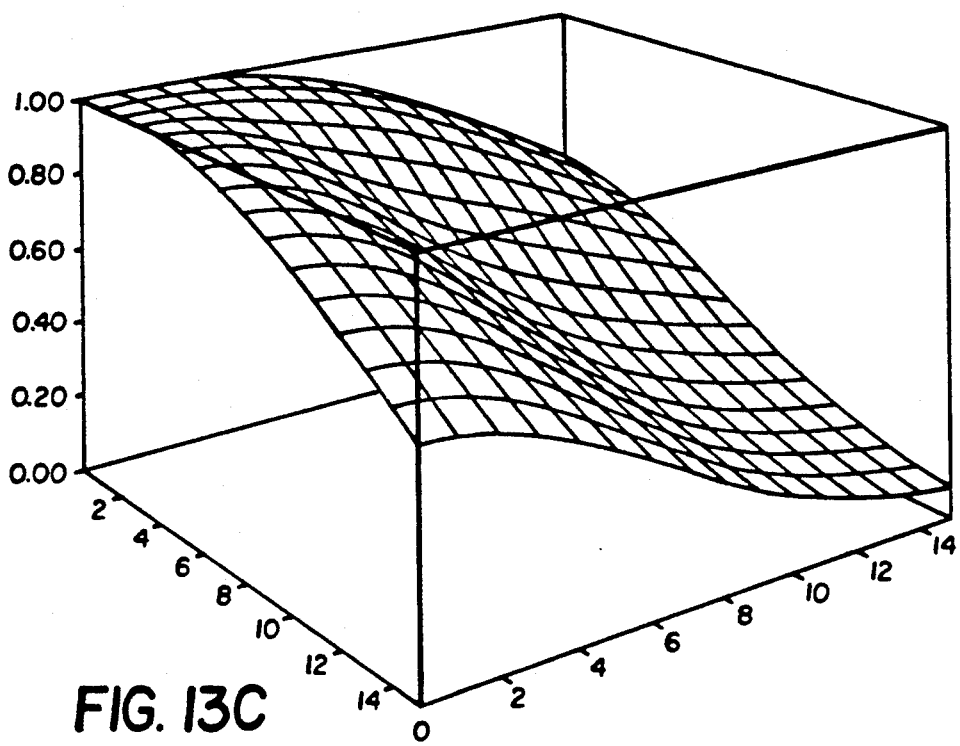

Next, in step 152 the number of cycles per degree of the visual angle (or subtense) is computed for each DCT coefficient from the number of cycles per millimeter and from the assumed distance V between the viewer and the display. The two-dimensional human visual contrast sensitivity function (CSF) is obtained in accordance with the teachings of the above-referenced U.S. Pat. No. 4,780,761 to Scott J. Daly et al. and is best expressed in units of cycles per degree of visual degree. One aspect of the CSF reflects the eye's perception of high spatial frequencies being affected by the distance to the image. There are other aspects also which need not be mentioned herein. Step 154 of FIG. 12 exploits the results of step 152 by associating an amplitude from the human visual contrast sensitivity function with each DCT coefficient based upon its spatial frequency in cycles per degree. The result is a 16-by-16 human contrast sensitivity function array. In FIG. 13c, the shape of the three dimensional surface corresponds to the two dimensional contrast sensitivity function of the image display. The intersection points in the grid superimposed on the three dimensional surface of FIG. 13c are the amplitudes associated with the individual DCT coefficients in step 154.

Figure 13D:
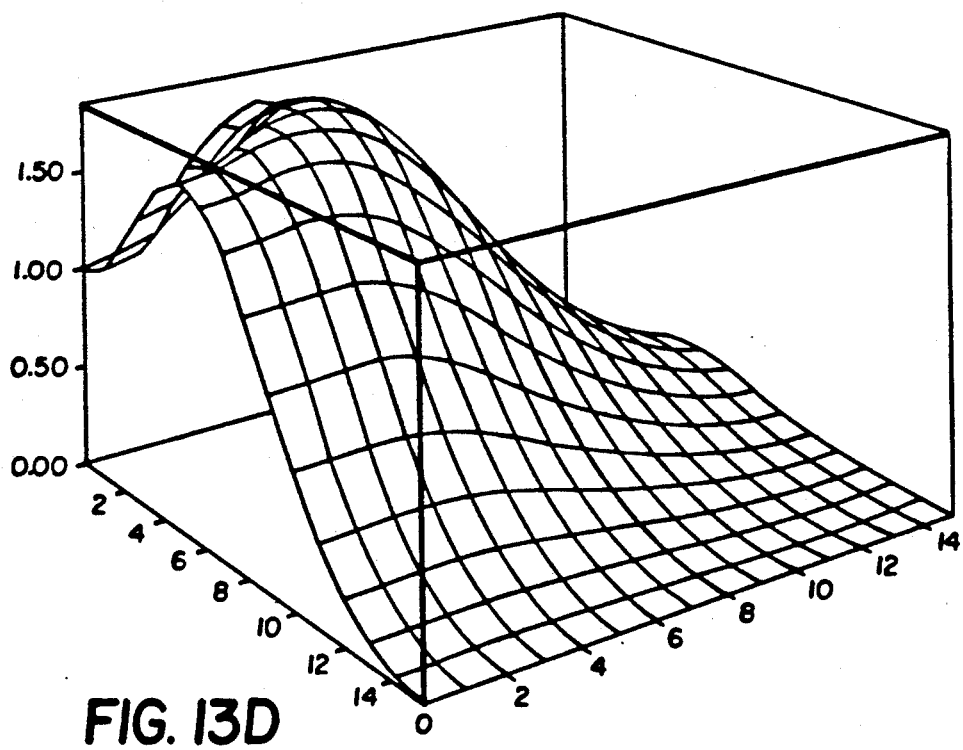
Figure 14A:
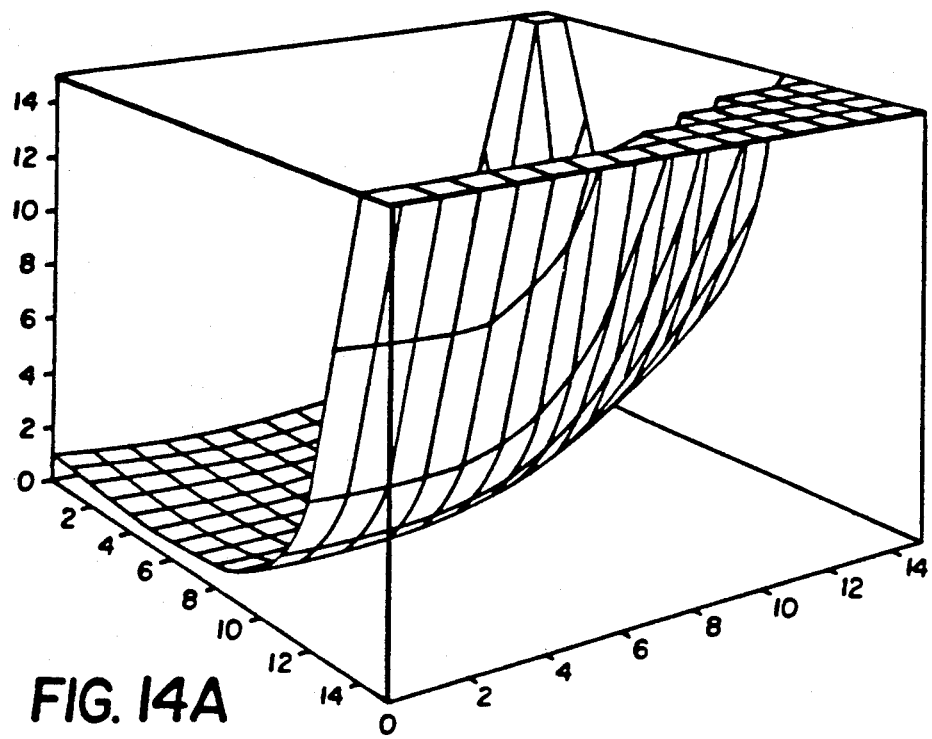
FIGS. 14a and 14b illustrate, respectively, the normalization factor array obtained from the cascaded array of FIG. 13d and a normalization array obtained from the contrast sensitivity function array of FIG. 13c alone.
Figure 14B:
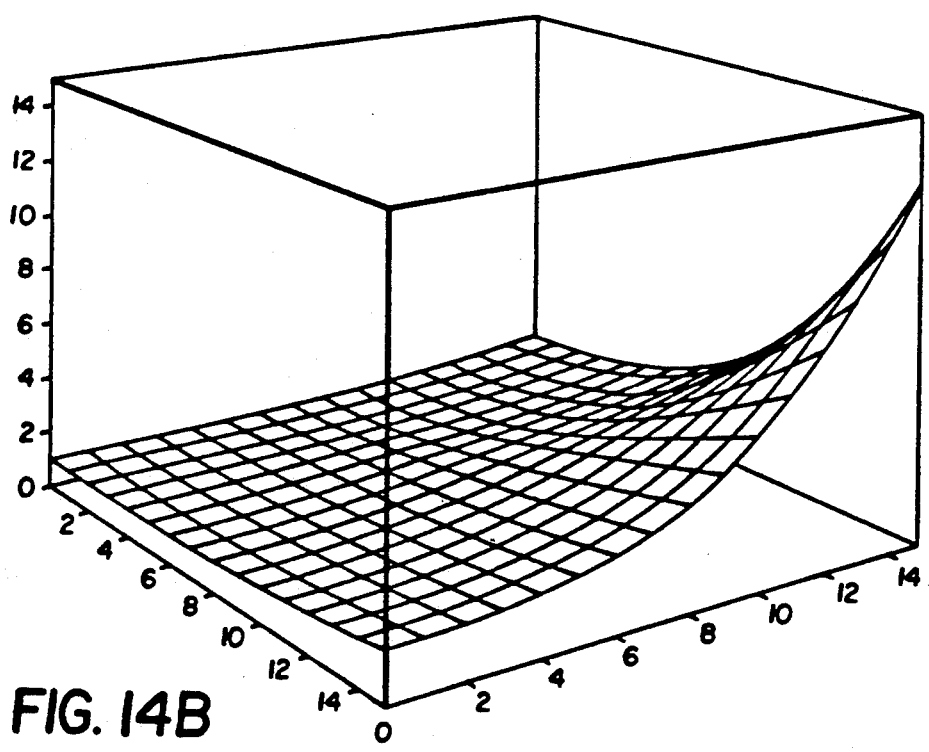

The display and edge enhancement modulation transfer function arrays are multiplied together in a multiplication step 156 coefficient-by-coefficient and the resulting 16-by-16 product array is multiplied by the contrast sensitivity array in a multiplication step 158 to produce a cascaded array illustrated in FIG. 13d. Each element of the resulting cascaded array is converted to its reciprocal in step 160 and multiplied by a bit rate factor to produce the normalization array illustrated in FIG. 14a. The normalization array may then be loaded into a look-up table, for example. The result (FIG. 14a) contrasts dramatically with the normalization array of FIG. 14b (disclosed in the above-referenced U.S. Patent to Scott Daly et al.) which takes into account the human visual contrast sensitivity function only.

In order to compensate for the lower spatial frequency response of the eye to color difference signals, different normalization arrays are produced by the normalization array generating step 125 for use in compressing the r-g and b-g color difference signals. For this purpose, the normalization array generating step 125 of FIG. 10a is depicted as three generating in steps 125a, 125b, 125c, labelled "green", "red-green" and "blue-green", respectively. The appropriate one of the normalization array generating steps 125a, 125b, 125c is selected depending upon whether the green signal or one of the color difference signals is to be compressed. Thus, a different normalization array is used with each of the g, r-g and b-g data blocks. Likewise, the normalization array generating step 125' of FIG. 10b is divided into separate normalization array generating steps 125'a, 125'b, 125'c.

The normalization arrays for the color difference signals compensate for the lower frequency human visual response to the color difference signals by altering the human visual contrast sensitivity function model described in the above-referenced U.S. Pat. No. 4,780,764 to Scott J. Daly et al. Specifically, the frequency variable r in the human visual contrast sensitivity function model equation $$H(r) = HA \times (HB + HC \times r) exp(-HC \times r)^{HD}$$

is multiplied by a factor greater than one. For the r-g color difference data block, this factor preferably equals 2 and the model equation thus becomes:

$$H(r) = HA \times (HB + HC \times 2r) exp(-HC \times 2r)^{HD}$$

for the r-g color difference signal. For the b-g color difference data block, the factor preferably equals 4. This reduces the effective bandwidth of the resulting contrast sensitivity function, thus accommodating the lower frequency response of the eye to the color differences r-g and b-g compared with the eye's response to green. The remaining steps in generating the 2-dimensional human visual contrast sensitivity function and producing therefrom the 16-by-16 contrast sensitivity function array are described in the above-referenced U.S. patent to Daly et al. and need not be described herein.

Figure 15A:
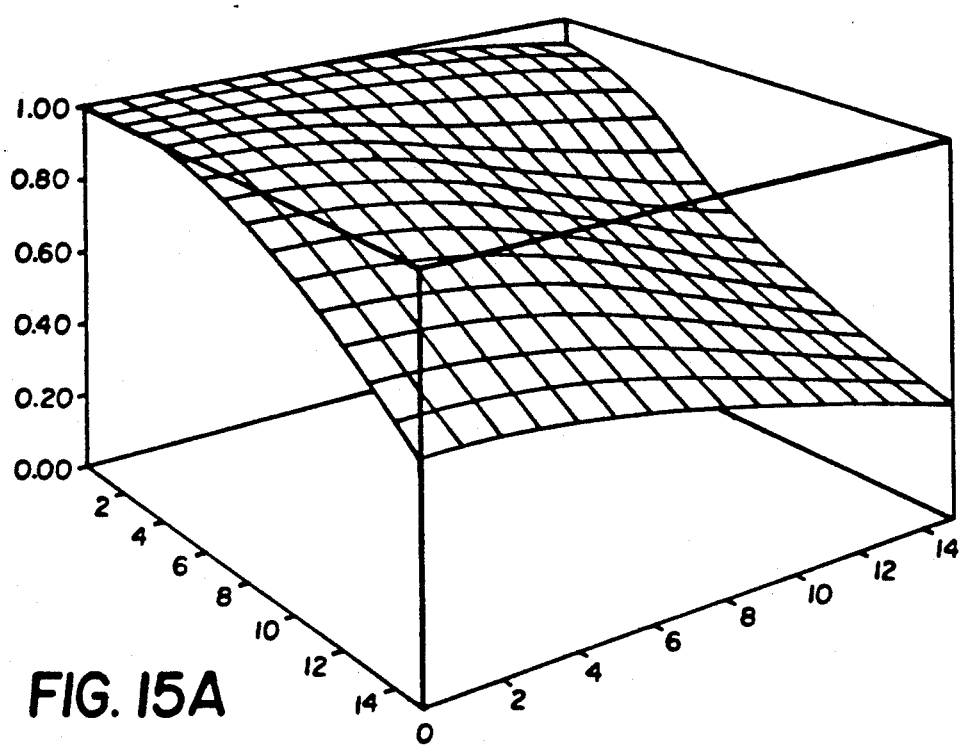
FIGS. 15a and 15b illustrate the contrast sensitivity functions for generating the normalization arrays for the R-G image data blocks and the B-G image data blocks, respectively.
Figure 15B:
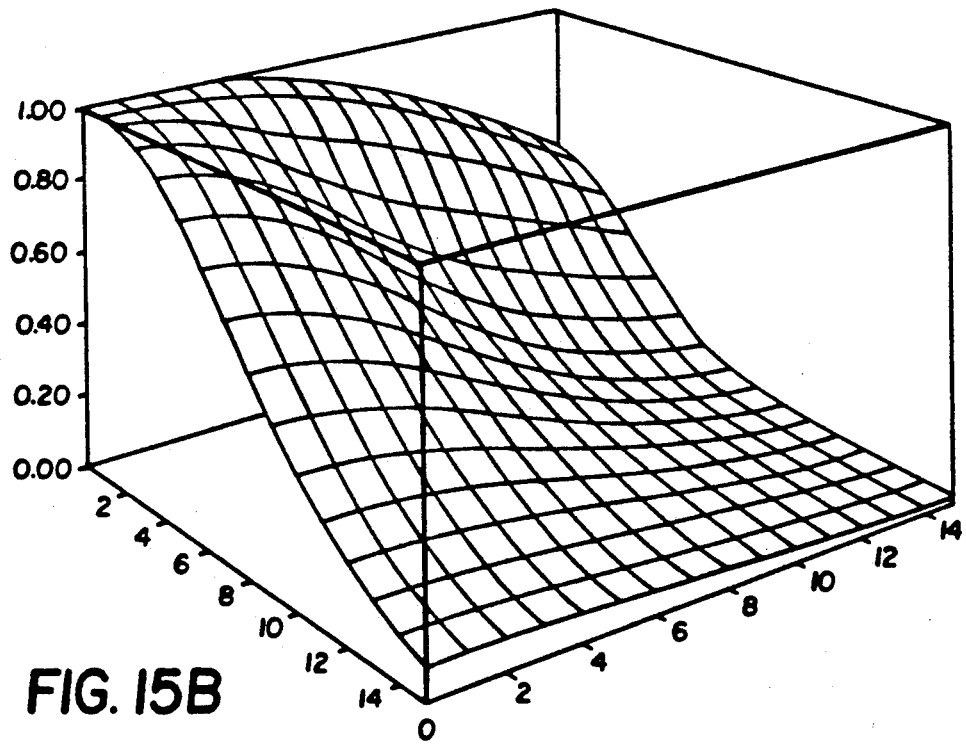

Because the CFA has different pixel-to-pixel spacings or patterns for different colors (illustrated in FIG. 3) and because the factors for the frequency variable r are different for the r-g and b-g blocks, the steps of FIG. 12 produce a different normalization array for each of the color difference signals. For example, the r-g normalization array is illustrated in FIG. 15a and the b-g normalization array is illustrated in FIG. 15b.

While the invention has been described with reference to a preferred embodiment using a 3G CFA in which the luminance-related color is green and the chrominance-related signals are r-g and b-g, other CFA's having different color schemes, different spatial patterns and a different luminance-related color as well as a different set of chrominance-related or color difference signals may be employed in carrying out the invention.

While the invention has been described in detail by specific reference to preferred embodiments thereof, modifications and variations thereof may be made without departing from the true spirit and scope of the invention.

What is claimed is:

1. Apparatus for transmitting and receiving a color image signal representing the amplitudes of a single image plane of pixels, each one of said pixels representing a respective one of three different colors whereby pixels of pairs of said colors are missing at sites of respective individual pixels, one of said three colors being more closely related to luminance than the remaining colors, said apparatus comprising:

A) transmitting means comprising:
        1) means for transforming the amplitude of each of said pixels to a Γ-space amplitude by changing its original value A to $A^{1/\Gamma}$, where Γ is a real number, whereby the Γ-space amplitudes of the pixels of said one color comprise a first input color data plane;
        2) first means for inferring by interpolation the Γ-space amplitudes of the missing pixels of said one color;
        3) means for forming second and third input color data planes of respective color difference signals by subtracting the Γ-space amplitudes of said missing pixels of said one color from the Γ-space amplitudes of corresponding pixels of each of said remaining colors, respectively;
        4) means for compressing each of said input color data planes to form corresponding first, second and third compressed color data planes;
    B) receiving means comprising:

1) means for decompressing said first, second and third compressed color data planes to form, respectively, first, second and third decompressed color data planes;
2) means for converting said first, second and third decompressed color data planes to first, second and third output color data planes, respectively, of Γ-space amplitudes of pixels of respective ones of said three colors;
3) means for edge enhancing said first, second and third output color data planes; and
4) means for back-transforming each of the Γ-space amplitudes $A^{1/\Gamma}$ of the pixels of said output color data planes to amplitudes A.

2. The apparatus of claim 1 wherein said image plane corresponds to a color filter array, said one color related to luminance is green and said remaining colors are red and blue and wherein Γ is about 2.4.

3. The apparatus of claim 1 wherein said transmitting means further comprise means for recording said compressed color data planes and wherein said receiving means further comprise means for playing back the compressed color data planes recorded by said means for recording.

4. The apparatus of claim 1 wherein said means for converting comprise means for determining from said decompressed color data planes Γ-space amplitudes of missing pixels of said three colors.

5. The apparatus of claim 4 wherein said means for determining comprises:
first means for computing from said first decompressed color data plane interpolated Γ-space amplitudes of missing pixels of said one color to produce said first output color data plane;
first means for adding said interpolated Γ-space amplitudes of said one color to corresponding Γ-space color difference signal amplitudes of said second and third decompressed color planes.

6. The apparatus of claim 5 wherein said means for determining further comprises:
second means for computing from said second and third decompressed color data planes interpolated Γ-space amplitudes of color difference signals corresponding to missing pixels of said remaining colors; and
second means for adding Γ-space amplitudes of pixels of said first decompressed color data plane to corresponding ones of said interpolated color difference signal Γ-space amplitudes computed by said second means for computing, to produce interpolated Γ-space amplitudes of the missing pixels of said remaining colors.

7. The apparatus of claim 6 wherein said image plane comprises pixel columns and pixel rows in a planar array of said pixels and said color related to luminance is green and has missing pixels in every $n^{th}$ pixel row of said image plane and said remaining colors are red and blue and have alternate pixels in every $n^{th}$ pixel row of said image plane, whereby said color difference signals correspond to red minus green and blue minus green, and wherein:
said first means for computing comprises means for vertically interpolating Γ-space amplitudes of missing green pixels within each pixel column of said first decompressed color data plane;
said second means for computing comprises:
(1) means for horizontally interpolating color difference signal Γ-space amplitudes corresponding to missing red and blue pixels in respective rows of said second and third compressed color data planes, and
(2) means for vertically interpolating color difference signal Γ-space amplitudes corresponding to missing red and blue pixels in each pixel column of said second and third compressed color data planes.

8. The apparatus of claim 4 wherein said first output color data plane corresponds to said one color related to luminance and wherein said means for edge enhancing comprises:
means for bandpass filtering each pixel column of Γ-space pixel amplitudes of said first output color data plane to produce a corresponding column of bandpass filtered Γ-space pixel amplitudes;
means for bandpass filtering each pixel row of Γ-space pixel amplitudes of said first output color data plane to produce a corresponding row of bandpass filtered Γ-space pixel amplitudes;
means for combining said bandpass filtered pixel rows and columns to produce two-dimensionally bandpass filtered Γ-space pixel amplitudes;
means for paring said two-dimensionally bandpass filtered Γ-space amplitudes whereby to boost high spatial frequency components having lower amplitudes and suppress high spatial frequency components having higher amplitudes; and
means for adding the Γ-space pixel amplitudes produced by said means for paring to amplitudes of corresponding pixels in each of said first, second and third output color data planes.

9. The apparatus of claim 8 wherein said columns of bandpass filtered amplitudes have greater high spatial frequency noise than said rows of bandpass filtered amplitudes, said apparatus further comprising:
means for low pass filtering said columns of bandpass filtered amplitudes.

10. The apparatus of claim 8 further comprising means for output color adjusting said amplitudes of the pixels of said output color data planes.

11. The apparatus of claim 1 wherein:
A) said means for compressing comprises:
1) means for dividing each of said input color data planes into transform blocks,
2) means for transforming the Γ-space amplitudes of each of said transform blocks into spatial frequency coefficients,
3) means for determining the number of encoded bits to represent each of said spatial frequency coefficients in compressed versions of said coefficients in accordance with a cascaded modulation transfer function corresponding to modulation transfer functions of selected elements of said apparatus,
4) encoding means for producing said encoded bits; and
B) wherein said means for decompressing comprises:
1) means for converting said encoded bits to decompressed spatial frequency coefficients,
2) means for back-transforming said decompressed spatial frequency coefficients of each transform block to pixel amplitudes.

12. The apparatus of claim 11 wherein said means for determining the number of encoded bits to represent each spatial frequency coefficient comprises:

means for producing a normalization array corresponding to said cascaded modulation transfer function;

means for dividing each spatial frequency coefficient by a corresponding element of said normalization array whereby to produce first normalized coefficients; and means for quantizing said first normalized coefficients.

13. The apparatus of claim 12 further comprising means for displaying an image of pixel amplitudes produced by the back-transforming means, wherein said cascaded modulation transfer function corresponds to modulation transfer functions of said means for edge enhancing and of said means for displaying.

14. The apparatus of claim 13 wherein said cascaded modulation transfer function further corresponds to a human visual contrast sensitivity function.

15. The apparatus of claim 14 wherein said means for producing said normalization array corresponding to said cascaded modulation transfer function comprises:

means for determining from the number of pixel rows and pixel columns in each of said transform blocks the number of cycles per pixel of each of said spatial frequency coefficients and means for associating each coefficient with a value of a modulation transfer function of said means for edge enhancing at a corresponding spatial frequency in cycles per pixel whereby to form an edge enhancement modulation transfer function array;

means for determining from pixel spacing corresponding to said means for displaying the number of cycles per unit distance of each of said spatial frequency coefficients and means for associating each coefficient with a value of a modulation transfer function of said means for displaying at a corresponding spatial frequency in cycles per unit distance whereby to form a display modulation transfer function array;

means for determining from a viewing distance corresponding to said means for displaying the number of cycles per degree of visual scan of each of said spatial frequency coefficients and means for associating each coefficient with a value of a human visual contrast sensitivity function at a corresponding spatial frequency in cycles per degree whereby to form a human visual contrast sensitivity function array;

means for cascading said arrays together whereby to form a cascaded array of plural elements comprising said cascaded modulation transfer function; and means for inversing each element of the cascaded array.

16. The apparatus of claim 12 wherein said means for converting said encoded bits to decompressed spatial frequency coefficients comprises:

means for decoding said encoded bits whereby to produce second normalized spatial frequency coefficients; and means for multiplying said second normalized spatial frequency coefficients by corresponding elements of said normalization array whereby to produce said decompressed spatial frequency coefficients.

17. The apparatus of claim 15 further comprising means for reducing the bandwidth of said human visual contrast sensitivity function by a predetermined factor whenever said means for compressing compresses said second or third input color data planes.

18. The apparatus of claim 17 wherein the spatial patterns of the pixels of said three colors in said image plane are different, whereby said means for determining the number of cycles per unit distance of said spatial frequency coefficients produce different normalization arrays depending upon which one of said first, second or third input color data planes is being compressed.

19. The apparatus of claim 17 wherein said second and third input color data planes comprise red minus green and blue minus green color difference signals and wherein said predetermined factor is 2 for said second input color data plane and 4 for said third input color data plane.

20. The apparatus of claim 11 wherein said means for transforming to spatial frequency coefficients performs a discrete cosine transform process, and wherein said means for producing said encoded bits comprises means for encoding each of said spatial frequency coefficients in accordance with a minimum redundancy code.

21. Apparatus for transmitting and receiving image data as arrays of pixels comprising:

means for sectioning the arrays of pixels into plural blocks of pixels;

means for spatial frequency transforming each of said blocks of pixels to form two-dimensional arrays of spatial frequency coefficients;

means for determining the number of cycles per pixel of each of said spatial frequency coefficients from the number of pixels in each row and column of a two-dimensional array of pixels wherein each pixel is associated with two positional indices;

edge enhancement modulation transfer function means for associating the two positional indices of each spatial coefficient with an associated value of an edge enhancement modulation transfer function at a corresponding spatial frequency in cycles per pixel to form an edge enhancement modulation transfer function array;

means for determining the number of cycles per unit distance of each of said spatial frequency coefficients form pixel spacing;

display modulation transfer function means for associating the two positional indices of each spatial frequency coefficient with an associated value of the display modulation transfer function in cycles per unit distance to form a display modulation transfer function array;

means for determining the number of cycles per degree of visual angle of each of said spatial frequency coefficients from a viewing distance;

human visual contrast sensitivity means for associating the two positional indices of each spatial frequency coefficient with an associated value of a human visual contrast sensitivity function in cycle per degree to form a visual contrast sensitivity function array; and means for combining said function arrays together to form a cascaded array the output of which is a normalization array.

22. The apparatus of claim 21 wherein said arrays represent, respectively, a luminance related component and a pair of color difference components of a color image, said apparatus further comprising means for reducing the bandwidth of said human visual contrast sensitivity function by a predetermined factor for applying the normalization array to different color difference component.

23. The apparatus of claim 22 wherein the spatial patterns of the pixels of said components are different, whereby said means for determining the number of cycles per unit distance of said spatial frequency coefficients produces different normalization arrays depending upon which one of the arrays of said image components is used.

24. The apparatus of claim 22 wherein said color difference components comprise red minus green and blue minus green color difference components and wherein said predetermined factor is 2 for the red minus green component and 4 for the blue minus green component.

25. Apparatus for edge enhancing a color image comprising three arrays of rows and columns of pixel amplitudes corresponding to three colors, one of said colors being more related to luminance than the others, comprising:

means for bandpass filtering each column of pixel amplitudes of said color related to luminance to produce a corresponding column of bandpass filtered pixel amplitudes;

means for bandpass filtering each row of pixel amplitudes of said color related to luminance to produce a corresponding row of bandpass filtered pixel amplitudes;

means for combining said bandpass filtered pixel rows and columns to produce two-dimensionally bandpass filtered pixel amplitudes;

means for paring said two-dimensionally bandpass filtered amplitudes so as to boost high spatial frequency components having lower amplitudes and so as to attenuate high spatial frequency components having higher amplitudes; and means for adding the two-dimensionally bandpass filtered pixel amplitudes to corresponding amplitudes of the pixels of each of said three colors.

26. The apparatus of claim 25 wherein each column of bandpass filtered amplitudes has more noise than each row, said apparatus further comprising:

means for low pass filtering each column of bandpass filtered amplitudes.

27. The apparatus of claim 25 further comprising means for output color adjusting said corresponding amplitudes of the pixels of said three colors.

28. Apparatus for transmitting a color image signal representing the amplitudes of a single image plane of pixels, each one of said pixels representing a respective one of three different colors whereby pixels of pairs of said colors are missing at sites of respective individual pixels, one of said three colors being more closely related to luminance than the remaining colors, said apparatus comprising:

means for transforming the amplitude of each of said pixels to a $\Gamma$-space amplitude by changing its original value A to $A^{1/\Gamma}$, where $\Gamma$ is a real number, whereby the $\Gamma$-space amplitudes of the pixels of said one color comprise a first input color data plane;

first means for inferring by interpolation the $\Gamma$-space amplitudes of the missing pixels of said one color;

means for forming second and third input color data planes of respective color difference signals by subtracting the $\Gamma$-space amplitudes of said missing pixels of said one color from the $\Gamma$-space amplitudes of corresponding pixels of each of said remaining colors, respectively; and means for compressing each of said input color data planes to form corresponding first, second and third compressed color data planes.

29. The apparatus of claim 28 wherein said image plane corresponds to a color filter array, said one color related to luminance is green and said remaining colors are red and blue and wherein $\Gamma$ is about 2.4.

30. The apparatus of claim 28 further comprising means for recording said compressed color data planes.

31. The apparatus of claim 28 wherein said means for compressing comprises:
1) means for dividing each of said input color data planes into transform blocks,
2) means for transforming the $\Gamma$-space amplitudes of each of said transform blocks into spatial frequency coefficients,
3) means for determining the number of encoded bits to represent each of said spatial frequency coefficients in compressed versions of said coefficients in accordance with a cascaded modulation transfer function corresponding to modulation transfer functions of image output elements, and
4) encoding means for producing said encoded bits.

32. The apparatus of claim 31 wherein said means for determining the number of encoded bits to represent each spatial frequency coefficient comprises:

means for producing a normalization array corresponding to said cascaded modulation transfer function;

normalization means for dividing each spatial frequency coefficient by a corresponding element of said normalization array whereby to produce first normalized coefficients; and means for quantizing said first normalized coefficients.

33. The apparatus of claim 32 wherein said cascaded modulation transfer function corresponds to modulation transfer functions of an edge enhancing apparatus and of an image displaying apparatus.

34. The apparatus of claim 33 wherein said cascaded modulation transfer function further corresponds to a human visual contrast sensitivity function.

35. The apparatus of claim 34 wherein said means for producing said normalization array corresponding to said cascaded modulation transfer function comprises:

means for determining from the number of pixel rows and pixel columns in each of said transform blocks the number of cycles per pixel of each of said spatial frequency coefficients and means for associating each coefficient with a value of the modulation transfer function of said edge enhancing apparatus at a corresponding spatial frequency in cycles per pixel whereby to form an edge enhancement modulation transfer function array;

means for determining from pixel spacing corresponding to the displaying means the number of cycles per unit distance of each of said spatial frequency coefficients and means for associating each coefficient with a value of the modulation transfer function of said image displaying apparatus at a corresponding spatial frequency in cycles per unit distance whereby to form a display modulation transfer function array;

means for determining from a viewing distance corresponding to said image displaying apparatus the number of cycles per degree of visual scan of each of said spatial frequency coefficients and means for associating each coefficient with a value of the human visual contrast sensitivity function at a corresponding spatial frequency in cycles per degree whereby to form a human visual contrast sensitivity function array; and means for cascading said arrays together whereby to form a cascaded array of plural elements comprising said cascaded modulation transfer function; and means for inversing each element of the cascaded array to form said normalization array.

36. The apparatus of claim 35 further comprising means for reducing the bandwidth of said human visual contrast sensitivity function by a predetermined factor whenever said means for compressing compresses said second or third input color data planes.

37. The apparatus of claim 36 wherein the spatial patterns of the pixels of said three colors in said image plane are different, whereby said means for determining the number of cycles per unit distance of said spatial frequency coefficients produce different normalization arrays depending upon which one of said first, second or third input color data planes is being compressed.

38. The apparatus of claim 36 wherein said second and third input color data planes comprise red minus green and blue minus green color difference signals and wherein said predetermined factor is 2 for said second input color data plane and 4 for said third input color data plane.

39. The apparatus of claim 31 wherein said means for transforming to spatial frequency coefficients comprises means for performing a discrete cosine transform, and wherein said means for producing said encoded bits comprises means for encoding each of said spatial frequency coefficients in accordance with a minimum redundancy code.

40. An apparatus for forming a normalization array, utilizing a two-dimensional array whose indices represent the spatial frequency coefficients resulting from the transformation of a digital image comprising:

means for determining the number of cycles per pixel of each of said spatial frequency coefficients from the number of pixels in each row and column of a two dimensional array of pixels wherein each pixel is associated with two positional indices;

edge enhancement modulation transfer function means for associating the two positional indices of each spatial coefficient with an associated value of an edge enhancement modulation transfer function at a corresponding spatial frequency in cycles per pixel to form an edge enhancement modulation transfer function array;

means for determining the number of cycles per unit distance of each of said spatial frequency coefficients form pixel spacing;

display modulation transfer function means for associating the two positional indices of each spatial frequency coefficient with an associated value of the display modulation transfer function in cycles per unit distance to form a display modulation transfer function array;

means for determining the number of cycles per degree of visual angle of each of said spatial frequency coefficients from a viewing distance;

human visual contrast sensitivity means for associating the two positional indices of each spatial frequency coefficient with an associated value of a human visual contrast sensitivity function in cycle per degree to form a visual contrast sensitivity function array; and means for combining said function arrays together to form a cascaded array the output of which is a normalization array.

41. The apparatus of claim 40 wherein said arrays of pixels represent, respectively, a luminance related component and a pair of color difference components of a color image, said apparatus further comprising means for reducing the bandwidth of said human visual contrast sensitivity function by a predetermined factor for applying the normalization array to different color difference component.

42. The apparatus of claim 41 wherein the spatial patterns of the pixels of said components are different, whereby said means for determining the number of cycles per unit distance of said spatial frequency coefficients produces different normalization arrays depending upon which one of the arrays of said image components is used.

43. The apparatus of claim 41 wherein said color difference components comprise red minus green and blue minus green color difference components and wherein said predetermined factor is 2 for the red minus green component and 4 for the blue minus green component.

44. Apparatus for receiving a color image signal comprising compressed data corresponding to $\Gamma$-space amplitudes $A^{1/\Gamma}$ of a single image plane of pixels, each one of said pixels representing a respective one of three different colors whereby pixels of pairs of said colors are missing at sites of respective individual pixels, one of said three colors being more closely related to luminance than the remaining colors, said compressed data comprising a first compressed color data plane comprising the $\Gamma$-space amplitudes of the pixels of said one color and second and third compressed color data planes comprising respective color difference signals formed by subtracting interpolated $\Gamma$-space amplitudes of missing pixels of said one color from the $\Gamma$-space amplitudes of corresponding pixels of each of said remaining colors, respectively, said apparatus comprising:

means for decompressing said compressed data to form first, second and third decompressed color data planes of $\Gamma$-space amplitudes corresponding to said first, second and third compressed color data planes, respectively;

means for converting said first, second and third decompressed color data planes to first, second and third output color data planes, respectively, of $\Gamma$-space amplitudes of pixels of respective ones of said three colors;

means for edge enhancing said first, second and third output color data planes; and means for back-transforming each of the $\Gamma$-space amplitudes $A^{1/\Gamma}$ of the pixels of said output color data planes to amplitudes A.

45. The apparatus of claim 44 wherein said image plane corresponds to a color filter array, said one color related to luminance is green and said remaining colors are red and blue and wherein $\Gamma$ is about 2.4.

46. The apparatus of claim 44 wherein said color image signal has been previously recorded, said apparatus further comprising means for playing back said color image signal.

47. The apparatus of claim 44 wherein said means for converting comprises means for determining from said decompressed color data planes $\Gamma$-space amplitudes of missing pixels of said three colors.

48. The apparatus of claim 47 wherein said means for determining comprises:
first means for computing from said first decompressed color data plane interpolated Γ-space amplitudes of missing pixels of said one color to produce said first output color data plane;
first means for adding said interpolated Γ-space amplitudes of said one color to corresponding Γ-space color difference signal amplitudes of said second and third decompressed color planes.

49. The apparatus of claim 48 wherein said means for determining further comprises:
second means for computing from said second and third decompressed color data planes interpolated Γ-space amplitudes of color difference signals corresponding to missing pixels of said remaining colors; and
second means for adding Γ-space amplitudes of pixels of said first decompressed color data plane to corresponding ones of said interpolated color difference signal Γ-space amplitudes computed by said second means for computing, whereby to produce interpolated Γ-space amplitudes of the missing pixels of said remaining colors.

50. The apparatus of claim 49 wherein said image plane comprises pixel columns and pixel rows in a planar array of said pixels and said color related to luminance is green and has missing pixels in every $n^{th}$ pixel row of said image plane and said remaining colors are red and blue and have alternate pixels in every $n^{th}$ pixel row of said image plane, whereby said color difference signals correspond to red minus green and blue minus green, and wherein:
said first means for computing comprises means for vertically interpolating Γ-space amplitudes of missing green pixels within each pixel column of said first decompressed color data plane;
said second means for computing comprises:
means for horizontally interpolating color difference signal Γ-space amplitudes corresponding to missing red and blue pixels in respective pixel rows of said second and third compressed color data planes, and
means for vertically interpolating color difference signal Γ-space amplitudes corresponding to missing red and blue pixels in each pixel column of said second and third compressed color data planes.

51. The apparatus of claim 47 wherein said first output color data plane corresponds to said one color related to luminance and wherein said means for edge enhancing comprises:
means for bandpass filtering each pixel column of Γ-space pixel amplitudes of said first output color data plane to produce a corresponding column of bandpass filtered Γ-space pixel amplitudes;
means for bandpass filtering each pixel row of Γ-space pixel amplitudes of said first output color data plane to produce a corresponding row of bandpass filtered Γ-space pixel amplitudes;
means for combining said bandpass filtered pixel rows and columns to produce two-dimensionally bandpass filtered Γ-space pixel amplitudes;
means for paring said two-dimensionally bandpass filtered Γ-space amplitudes whereby to boost high spatial frequency components having lower amplitudes and suppress high spatial frequency components having higher amplitudes; and means for adding the Γ-space pixel amplitudes produced by said means for paring to amplitudes of corresponding pixels in each of said first, second and third output color data planes.

52. The apparatus of claim 51 wherein said columns of bandpass filtered amplitudes have greater high spatial frequency noise than said rows of bandpass filtered amplitudes, said apparatus further comprising:
means for low pass filtering said columns of bandpass filtered amplitudes.

53. The apparatus of claim 51 further comprising means for output color adjusting said amplitudes of the pixels of said output color data planes.

54. The apparatus of claim 44 wherein said compressed data comprises compressed normalized spatial frequency coefficients and wherein said means for decompressing comprises:
1) means for producing decompressed normalized coefficients from said compressed normalized coefficients,
2) means for denormalizing said decompressed coefficients in accordance with a cascaded modulation transfer function corresponding to modulation transfer functions of selected elements of said apparatus, whereby to produce denormalized spatial frequency coefficients,
3) means for back-transforming respective transform blocks of the denormalized spatial frequency coefficients to blocks of pixel amplitudes whereby to produce said first, second and third decompressed color data planes.

55. The apparatus of claim 54 wherein said means for producing decompressed normalized coefficients comprises:
means for decoding said recorded data in accordance with a minimum redundancy code whereby to produce said decompressed normalized spatial frequency coefficients; and
wherein said means for denormalizing comprise:
means for multiplying said decompressed normalized spatial frequency coefficients by corresponding elements of a normalization array corresponding to said cascaded modulation transfer function whereby to produce said denormalized spatial frequency coefficients.

56. The apparatus of claim 55 further comprising means for displaying an image comprising pixel amplitudes produced by the back-transforming means, wherein said cascaded modulation transfer function corresponds to modulation transfer functions of said means for edge enhancing and of said means for displaying.

57. The apparatus of claim 56 wherein said cascaded modulation transfer function further corresponds to a human visual contrast sensitivity function.

58. The apparatus of claim 57 further comprising means for producing said normalization array corresponding to said cascaded modulation transfer function, comprising:
means for determining from the number of pixel rows and pixel columns in each of said transform blocks the number of cycles per pixel of each of said spatial frequency coefficients and means for associating each coefficient with a value of a modulation transfer function of said edge enhancing means at a corresponding spatial frequency in cycles per pixel whereby to form an edge enhancement modulation transfer function array;

means for determining from pixel spacing corresponding to said means for displaying the number of cycles per unit distance of each of said spatial frequency coefficients and means for associating each coefficient with a value of a modulation transfer function of said displaying means at a corresponding spatial frequency in cycles per unit distance whereby to form a display modulation transfer function array;

means for determining from a viewing distance corresponding to said displaying means the number of cycles per degree of visual scan of each of said spatial frequency coefficients and means for associating each coefficient with a value of a human visual contrast sensitivity function at a corresponding spatial frequency in cycles per degree whereby to form a human visual contrast sensitivity function array;

means for cascading said arrays together whereby to form a cascaded array of plural elements comprising said cascaded modulation transfer function; and means for inversing the elements of said cascaded array.

59. The apparatus of claim 58 further comprising means for reducing the bandwidth of said human visual contrast sensitivity function by a predetermined factor whenever said means for compressing compresses said second or third input color data planes.

60. The apparatus of claim 59 wherein the spatial patterns of the pixels of said three colors in said image plane are different, whereby said means for determining the number of cycles per unit distance of said spatial frequency coefficients produce different normalization arrays depending upon which one of said first, second or third input color data planes is being compressed.

61. The apparatus of claim 59 wherein said second and third input color data planes comprise red minus green and blue minus green color difference signals and wherein said predetermined factor is 2 for said second input color data plane and 4 for said third input color data plane.

62. The apparatus of claim 54 wherein said means for back-transforming said decompressed spatial frequency coefficients performs an inverse discrete cosine transform.

* * * * *